US008479470B2

(12) United States Patent
Commins et al.

(10) Patent No.: US 8,479,470 B2
(45) Date of Patent: Jul. 9, 2013

(54) BUILDING WALL FOR RESISTING LATERAL FORCES

(75) Inventors: Alfred D. Commins, Friday Harbor, WA (US); Robert C. Gregg, Yorba Linda, CA (US); William F. Leek, Anaheim, CA (US); Karen W. Colonias, Danville, CA (US); Arthur R. Linn, Byron, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 258 days.

(21) Appl. No.: 09/922,581

(22) Filed: Aug. 3, 2001

(65) Prior Publication Data
US 2002/0002806 A1 Jan. 10, 2002

Related U.S. Application Data

(63) Continuation of application No. 08/975,940, filed on Nov. 21, 1997.

(51) Int. Cl.
*E04B 2/56* (2006.01)
*E04C 2/34* (2006.01)
*E04H 9/02* (2006.01)

(52) U.S. Cl.
USPC .......... 52/481.1; 52/167.1; 52/293.3; 52/295; 52/698; 52/790.1; 52/800.18

(58) Field of Classification Search
USPC ................... 52/202, 167.1, 167.3, 293.3, 477, 52/481.1, 514, 764–765, 790.1, 800.12, 698, 52/295, 800.18, 285.2, 713, 241; 411/536
See application file for complete search history.

(56) References Cited

U.S. PATENT DOCUMENTS

| 140,526 | A | 7/1873 | Munson |
| 328,185 | A | 10/1885 | Butcher |
| 390,732 | A | 10/1888 | Weston |
| 673,558 | A | 5/1901 | Kline |

(Continued)

FOREIGN PATENT DOCUMENTS

| AU | 228186 | 1/1959 |
| AU | 549294 | 1/1983 |

(Continued)

OTHER PUBLICATIONS

LBN—Light Beam Inc., Steel Homes 1995.

(Continued)

*Primary Examiner* — Winnie Yip
(74) *Attorney, Agent, or Firm* — James R. Cypher; Charles R. Cypher

(57) ABSTRACT

This invention relates to an improved wall for resisting lateral forces imposed on a building that incorporates the wall. Specifically, this invention relates to a wall in a light-frame building having within it a sub-component specifically designed to resist lateral forces imposed on the building such as those caused by an earthquake or by wind loading. The wall is formed with a bottom plate that rests on the underlying structural component of the building. A plurality of vertically-disposed studs connect to the bottom plate, and a top plate is supported by and connects to the vertically-disposed studs. A shear-resisting assembly connects to the top plate and the underlying structural component. The shear-resisting assembly has top and bottom struts and first and second chords and a planar shear resisting element connected thereto.

11 Claims, 16 Drawing Sheets

U.S. PATENT DOCUMENTS

| | | | |
|---|---|---|---|
| 1,353,998 A | 9/1920 | Laughlin | |
| 1,604,605 A | 10/1926 | Purdy | |
| 1,607,166 A | 11/1926 | McCall | |
| 1,622,962 A | 3/1927 | Michod | |
| 1,689,642 A | 10/1928 | Rappleyea | |
| RE17,154 E | 12/1928 | Purdy | |
| 1,719,200 A * | 7/1929 | Schumacher | 52/800.12 |
| 1,742,045 A | 12/1929 | Menes | |
| 1,849,273 A | 3/1932 | Broderick | |
| 1,895,667 A | 1/1933 | Junkers | |
| 1,997,809 A | 4/1935 | Coles | |
| 2,010,971 A | 8/1935 | Thomson | |
| 2,020,988 A | 11/1935 | Balletta | |
| 2,053,226 A | 9/1936 | Ruge | |
| 2,063,010 A | 12/1936 | Balduf | |
| 2,076,728 A | 4/1937 | Keller | |
| 2,080,593 A | 5/1937 | Albert | |
| 2,089,023 A | 8/1937 | Hahn | |
| 2,124,519 A | 7/1938 | Piersen et al. | |
| 2,137,767 A | 11/1938 | Betcone | |
| 2,154,520 A | 4/1939 | Mackin | |
| 2,160,225 A | 5/1939 | Newman | |
| 2,180,830 A | 11/1939 | Le Tourneau | |
| 2,191,804 A | 2/1940 | O'Malley | |
| 2,191,904 A | 2/1940 | O'Malley | |
| 2,193,550 A | 3/1940 | Coe, Jr. | |
| 2,254,190 A * | 8/1941 | Ricken | 52/800.18 |
| 2,256,394 A | 9/1941 | Lamel | |
| 2,263,214 A | 11/1941 | Larkin et. al. | |
| 2,271,584 A | 2/1942 | Fellom | |
| 2,278,331 A | 3/1942 | Meyercord | |
| 2,281,185 A | 4/1942 | Forster | |
| 2,445,491 A | 7/1948 | Moloney | |
| 2,457,964 A | 1/1949 | Wyche | |
| 2,497,887 A | 2/1950 | Hilpert | |
| 2,576,530 A | 11/1951 | Medal | |
| 2,633,610 A | 4/1953 | Hervey | |
| 2,666,238 A * | 1/1954 | Hagedorn | 403/189 |
| 2,725,608 A | 12/1955 | Parslow | |
| 2,742,114 A | 4/1956 | Behlen | |
| 2,743,980 A | 5/1956 | Hobbs | |
| 2,803,856 A | 8/1957 | Kofahl et al. | |
| 2,856,646 A | 10/1958 | Latimer et al. | |
| 3,010,547 A | 11/1961 | Foster | |
| 3,037,593 A | 6/1962 | Webster | |
| 3,133,322 A | 5/1964 | Douglas | |
| 3,143,827 A | 8/1964 | Showalter | |
| 3,160,245 A | 12/1964 | Paylecka | |
| 3,172,509 A | 3/1965 | Dugger | |
| 3,206,903 A | 9/1965 | Johnson | |
| 3,300,926 A | 1/1967 | Heirich | |
| 3,304,675 A | 2/1967 | Graham-Wood et al. | |
| 3,310,917 A | 3/1967 | Simon | |
| 3,328,927 A | 7/1967 | Kates | |
| 3,360,892 A | 1/1968 | Rosso | |
| 3,452,501 A | 7/1969 | Sickler et al. | |
| 3,474,582 A | 10/1969 | Wah et al. | |
| 3,568,388 A | 3/1971 | Flachbarth | |
| 3,612,291 A | 10/1971 | Skubic | |
| 3,623,288 A * | 11/1971 | Horowitz | 52/264 |
| 3,633,327 A | 1/1972 | Klingemsmith et al. | |
| 3,638,380 A | 2/1972 | Perri | |
| 3,657,849 A | 4/1972 | Garton | |
| 3,658,388 A | 4/1972 | Hasegawa | |
| 3,668,828 A | 6/1972 | Nicholas et al. | |
| 3,724,078 A | 4/1973 | Carline et al. | |
| 3,744,197 A | 7/1973 | Wetzel, Jr. | |
| 3,748,799 A | 7/1973 | Tough et al. | |
| 3,775,920 A * | 12/1973 | Schneller | 52/241 |
| 3,820,295 A | 6/1974 | Folley | |
| 3,822,521 A | 7/1974 | Lucas | |
| 3,854,253 A | 12/1974 | Slowbe | |
| 3,871,153 A | 3/1975 | Birum | |
| 3,875,719 A | 4/1975 | Menge | |
| 3,916,578 A | 11/1975 | Forootan et al. | |
| 4,016,697 A | 4/1977 | Ericson | |
| 4,016,698 A | 4/1977 | Rogers | |
| 4,037,281 A * | 7/1977 | Reynolds | 52/800.12 |
| 4,037,379 A | 7/1977 | Ozanne | |
| 4,037,381 A | 7/1977 | Charles | |
| 4,040,232 A | 8/1977 | Snow et al. | |
| 4,065,218 A | 12/1977 | Biggane | |
| 4,069,635 A | 1/1978 | Gilb | |
| 4,074,487 A | 2/1978 | Daniels et al. | |
| 4,078,352 A | 3/1978 | Knowles | |
| 4,114,333 A | 9/1978 | Jones et al. | |
| 4,122,647 A | 10/1978 | Kovar | |
| 4,130,970 A | 12/1978 | Cable | |
| 4,157,002 A | 6/1979 | Adolph | |
| 4,182,080 A | 1/1980 | Naylor | |
| 4,220,423 A | 9/1980 | Sivachenko | |
| 4,221,087 A | 9/1980 | Lowe | |
| 4,250,671 A | 2/1981 | Hirsch et al. | |
| 4,283,892 A | 8/1981 | Brown | |
| 4,292,782 A | 10/1981 | Schaeffer | |
| 4,295,299 A | 10/1981 | Nelson | |
| 4,295,318 A | 10/1981 | Perlman | |
| 4,301,628 A | 11/1981 | Lowe | |
| 4,309,853 A | 1/1982 | Lowe | |
| 4,321,776 A * | 3/1982 | Delight | 52/167.1 |
| 4,339,903 A | 7/1982 | Menge | |
| 4,366,659 A | 1/1983 | Jensen | |
| 4,370,843 A | 2/1983 | Menge | |
| 4,435,932 A | 3/1984 | Seaburg et al. | |
| 4,439,957 A | 4/1984 | Raasakka | |
| 4,441,286 A | 4/1984 | Skvaril | |
| 4,441,289 A | 4/1984 | Ikuo et al. | |
| 4,471,591 A | 9/1984 | Jamison | |
| 4,498,264 A | 2/1985 | McCafferty et al. | |
| 4,514,950 A | 5/1985 | Goodson, Jr. | |
| 4,522,000 A | 6/1985 | Barari | |
| 4,546,590 A | 10/1985 | Finch et al. | |
| 4,552,094 A * | 11/1985 | Johnson | 52/800.12 |
| 4,559,748 A | 12/1985 | Ressel | |
| 4,563,851 A | 1/1986 | Long | |
| 4,577,826 A | 3/1986 | Bergström et al. | |
| 4,603,531 A | 8/1986 | Nash | |
| 4,631,894 A | 12/1986 | Jerila | |
| 4,633,634 A | 1/1987 | Nemmer et al. | |
| 4,637,195 A | 1/1987 | Davis | |
| 4,648,216 A | 3/1987 | Reaves et al. | |
| 4,706,422 A | 11/1987 | Ashton | |
| 4,726,166 A | 2/1988 | DeRees | |
| 4,736,566 A | 4/1988 | Krotsch | |
| 4,794,746 A | 1/1989 | Ramer | |
| 4,799,339 A | 1/1989 | Kobori et al. | |
| 4,863,189 A | 9/1989 | Linday | |
| 4,875,314 A | 10/1989 | Boilen | |
| 4,879,160 A | 11/1989 | Knudson et al. | |
| 4,910,929 A | 3/1990 | Scholl | |
| 4,918,900 A | 4/1990 | Fee et al. | |
| 4,922,667 A | 5/1990 | Kobori et al. | |
| 4,937,993 A | 7/1990 | Hitchins | |
| 4,937,997 A | 7/1990 | Thomas, Jr. et al. | |
| 5,056,577 A | 10/1991 | Delong et al. | |
| 5,065,558 A | 11/1991 | Boatsman | |
| 5,070,661 A | 12/1991 | Lo Guidici | |
| 5,072,570 A | 12/1991 | Johnson | |
| 5,218,803 A | 6/1993 | Wright | |
| 5,271,197 A | 12/1993 | Uno et al. | |
| 5,279,088 A | 1/1994 | Heydon | |
| 5,333,426 A | 8/1994 | Varoglu | |
| 5,345,716 A | 9/1994 | Caplan | |
| 5,350,265 A | 9/1994 | Kinner | |
| 5,353,560 A | 10/1994 | Heydon | |
| 5,375,384 A * | 12/1994 | Wolfson | 52/295 |
| 5,388,358 A | 2/1995 | Mazhar | |
| 5,390,466 A | 2/1995 | Johnson et al. | |
| 5,417,026 A | 5/1995 | Brumfield | |
| 5,426,893 A | 6/1995 | Hoffman | |
| 5,457,927 A | 10/1995 | Pellock et al. | |
| 5,467,570 A | 11/1995 | Leek | |
| 5,491,950 A | 2/1996 | Obegi | |
| 5,499,480 A | 3/1996 | Bass | |
| 5,505,031 A | 4/1996 | Heydon | |
| 5,524,406 A | 6/1996 | Ragland | |
| 5,546,723 A | 8/1996 | Jones | |

| | | | | | |
|---|---|---|---|---|---|
| 5,553,437 A | 9/1996 | Navon | 2005/0126105 A1 | 6/2005 | Leek et al. |
| 5,579,615 A | 12/1996 | Hoffman | 2005/0284073 A1 | 12/2005 | Leek et al. |
| 5,581,969 A | 12/1996 | Kelleher | 2007/0062135 A1 | 3/2007 | Mueller |
| 5,617,693 A | 4/1997 | Hefner | | | |

FOREIGN PATENT DOCUMENTS

| | | |
|---|---|---|
| AU | PM 6487 | 6/1994 |
| AU | 715517 | 1/1996 |
| AU | A-23306/95 | 1/1996 |
| CA | 2196869 | 2/1996 |
| CH | 419 526 | 3/1967 |
| DE | 259837 | 6/1912 |
| EP | 0 468 949 A1 | 6/1991 |
| FR | 2 599 408 | 12/1987 |
| GB | 2 315 288 A | 1/1998 |
| JP | S49-108213 A | 10/1974 |
| JP | S52-12113 U1 | 1/1977 |
| JP | 52-19113 | 2/1977 |
| JP | 54087616 | 6/1979 |
| JP | S54-152319 A | 11/1979 |
| JP | S57-106810 U1 | 7/1982 |
| JP | S57-143307 U1 | 9/1982 |
| JP | 60-122420 | 8/1984 |
| JP | 60-85144 | 5/1985 |
| JP | S60-85144 A | 5/1985 |
| JP | S60-122420 U1 | 8/1985 |
| JP | 63-039297 | 10/1988 |
| JP | 02049449 | 4/1990 |
| JP | 03199550 | 8/1991 |
| JP | 3-208936 | 9/1991 |
| JP | 4-83038 | 3/1992 |
| JP | 4-98908 | 8/1992 |
| JP | 5-44276 | 2/1993 |
| JP | 6-2358 | 1/1994 |
| JP | 6-322839 | 11/1994 |
| JP | 8-159121 | 6/1996 |
| JP | H08-284296 A | 10/1996 |
| JP | 8-296278 | 11/1996 |
| JP | 8-302861 | 11/1996 |
| JP | 9-256738 | 9/1997 |
| JP | 9-273214 | 10/1997 |
| JP | 9-279684 | 10/1997 |
| JP | 10-140653 | 5/1998 |
| JP | 10-184076 | 7/1998 |
| JP | 11229490 | 8/1999 |
| JP | 2003293487 | 10/2003 |
| NZ | 186060 | 11/1980 |
| NZ | 221612 | 3/1993 |
| WO | WO 96/02713 | 2/1996 |

Patent References (continued):

| | | |
|---|---|---|
| 5,619,837 A | 4/1997 | DiSanto |
| 5,628,495 A | 5/1997 | Gandara |
| 5,640,824 A | 6/1997 | Johnson et al. |
| 5,649,403 A | 7/1997 | Haisch |
| 5,651,229 A | 7/1997 | Wada et al. |
| 5,657,606 A | 8/1997 | Ressel et al. |
| 5,664,388 A | 9/1997 | Chapman et al. |
| 5,692,353 A | 12/1997 | Bass |
| 5,706,614 A | 1/1998 | Wiley, Jr. et al. |
| 5,706,626 A | 1/1998 | Mueller |
| 5,713,176 A | 2/1998 | Hunt |
| 5,727,663 A | 3/1998 | Taylor |
| 5,729,950 A | 3/1998 | Hardy |
| 5,735,087 A | 4/1998 | Olden |
| 5,761,873 A | 6/1998 | Slater |
| 5,782,047 A | 7/1998 | De Quesada |
| 5,782,054 A | 7/1998 | Varoglu |
| 5,788,396 A | 8/1998 | Goto |
| 5,788,397 A | 8/1998 | Goto |
| 5,807,014 A | 9/1998 | Goto |
| 5,807,015 A | 9/1998 | Goto |
| 5,823,701 A | 10/1998 | Goto |
| 5,842,318 A | 12/1998 | Bass et al. |
| 5,845,438 A | 12/1998 | Haskell |
| 5,848,512 A | 12/1998 | Conn |
| 5,862,639 A | 1/1999 | Abou-Rached |
| 5,870,870 A | 2/1999 | Utzman |
| 5,873,672 A | 2/1999 | Goto |
| 5,904,025 A | 5/1999 | Bass et al. |
| 5,906,451 A | 5/1999 | Goto |
| D411,021 S | 6/1999 | Chapman et al. |
| 5,921,054 A | 7/1999 | Rudd |
| 5,924,815 A | 7/1999 | Goto |
| 5,937,607 A | 8/1999 | Li |
| 5,950,385 A | 9/1999 | Herren |
| 5,979,130 A * | 11/1999 | Gregg et al. .................. 52/295 |
| 5,987,828 A | 11/1999 | Hardy |
| 5,996,292 A | 12/1999 | Hill et al. |
| 6,006,487 A | 12/1999 | Leek |
| 6,018,917 A | 2/2000 | Leek |
| 6,067,769 A | 5/2000 | Hardy |
| 6,073,413 A | 6/2000 | Tongiatama |
| 6,079,168 A | 6/2000 | Shaver |
| 6,109,850 A | 8/2000 | Commins |
| 6,148,583 A | 11/2000 | Hardy |
| 6,158,184 A | 12/2000 | Timmerman, Sr. |
| 6,185,898 B1 | 2/2001 | Pratt |
| 6,192,637 B1 | 2/2001 | Boilen et al. |
| 6,205,725 B1 | 3/2001 | Butler |
| 6,212,849 B1 | 4/2001 | Pellock |
| 6,240,695 B1 | 6/2001 | Karalic |
| 6,244,004 B1 | 6/2001 | Timmerman, Sr. |
| 6,250,029 B1 | 6/2001 | Jeffers et al. |
| 6,260,323 B1 | 7/2001 | Hockey |
| 6,298,612 B1 * | 10/2001 | Adams .................. 52/167.3 |
| 6,298,617 B1 | 10/2001 | de Quesada |
| 6,308,469 B1 | 10/2001 | Leung |
| 6,327,831 B1 | 12/2001 | Leek |
| 6,345,476 B1 | 2/2002 | Hill |
| 6,385,942 B1 | 5/2002 | Grossman et al. |
| 6,481,175 B2 | 11/2002 | Potter et al. |
| 6,484,460 B2 | 11/2002 | Van Haitsma |
| 6,560,940 B2 | 5/2003 | Mueller |
| 6,615,896 B1 | 9/2003 | Andalia |
| 6,643,986 B2 | 11/2003 | Commins et al. |
| 6,662,506 B2 | 12/2003 | Fischer et al. |
| 6,668,508 B2 | 12/2003 | Boone et al. |
| 6,877,285 B2 | 4/2005 | Poma et al. |
| 7,073,298 B1 | 7/2006 | Phan |
| 7,251,920 B2 | 8/2007 | Timmerman et al. |
| 2001/0002529 A1 | 6/2001 | Commins et al. |
| 2002/0002806 A1 | 1/2002 | Commins et al. |
| 2002/0020122 A1 | 2/2002 | Mueller |
| 2003/0009964 A1 | 1/2003 | Trarup et al. |
| 2004/0068947 A1 | 4/2004 | Commins et al. |

OTHER PUBLICATIONS

ICBO Evaluation Service, Inc. Report: STS Prefabricated Lateral-Force Resisting (LFR) Panel System. Jul. 1, 1998.

Thallon, Rob. Graphic Guide to Frame Construction. Sep. 1991. pp. 70, 77, 79-82. The Taunton Press, Newtown, CT.

American Plywood Association, 1992. APA Homeowner's Guide to Earthquake Safeguards.Selected Web Pages, 13 pgs.

Simpson Strong-Tie co., Inc. Copyright 1991. Total 16 pages Connectors for Earthquake Retrofit and New Construction.

Breyer, Donald E. Design of Wood Structures. 1993. Chapter 3, §§ 3.1, 3.3, 3.4 and Chapter 10.

Japanese Language Newspaper Article, 1 pg.

Japanese Language Magazine Article, "Wide Focus", 2 pgs. p. 20 and 21.

Color Photocopies, "Wood Framed Residential Project in Kobe Japan Utilizing MFG. LWM Steel Shear Panels", 4 pgs., 1996.

"Temblor spurs builder to create anti-quake frame," Daily Press (Victorville, California), p. A-4 (1pg), (Apr. 26, 1999).

"P.T. Brace," Roll Form Industries Pty Ltd (Acacia Ridge, Qld.), (2 pgs).

Simpson Strong-Tie Company, Inc. Catalogue, "Handbook of Structural Designs & Load Values," Strong-Tie Timber Connectors (2pgs), (Sep. 20, 1978).

Donald E. Breyer, "Design of Wood Structures," 3rd ed., McGraw-Hill, Inc., (100 pgs), (Dec. 20, 1993).

U.S. Appl. No. 60/003,181, filed Sep. 5, 1995, "Z-Wall", James A. Adams.

U.S. Appl. No. 60/043,835, filed Apr. 4, 1997, "Lateral Force Resisting System", Timothy L. Timmerman.
U.S. Appl. No. 60/017,741, filed May 15, 1996, "Shear Panel Joint", Charles H. Utzman.
Roll Form Industries Pty. Ltd. and Concise Drafting Services, various letters, drawings and a brochure from Paul Tongiatama, E. La Monaca, J.House and Roll for Industries Pty. Ltd.
Provisional Specification, PT Brace, Author: Paul Polikapo Tongiatama, Jun. 28, 1999.
U.S. Appl. No. 08/873,972, filed Jun. 12, 1997, "Diaphragm with Perimeter Edging on Structural Panels", Al Commins and Robert Gregg.
Simpson Strong-Tie Company, Inc., "LTP/A34/A35 Framing Anchors," Simpson Strong-Tie Connectors, Simpson Strong-Tie Company, Inc. (U.S.A.), numbered p. 58, (1995).
Simpson Strong-Tie Company, Inc., "CS/CMST Coiled Straps," Simpson Strong-Tie Connectors, Simpson Strong-Tie Company, Inc. (U.S.A.), numbered p. 56, (1995).
Edward L. Keith, P.E., "153 Big Bin: Performance and Testing," Research Report American Plywood Association, American Plywood Association (Tacoma, Washington U.S.A.), front cover, numbered 1-24, back cover, (May 1990).
Ben L. Schmid Calculation Sheet, "Apartment Bldgs Seismic Strengthening," total of 1 page, (Jul. 30, 1994).
John R. Tissell, P.E and John D. Rose, "146 Roof Diaphragms for Manufactured Homes," Research Report American Plywood Association Technical Services Division, American Plywood Association (Tacoma, Washington U.S.A.), front cover, numbered pp. 3-30, back cover, (Revised Sep. 1993).
American Plywood Association,"Stapled Sheet Metal Blocking for APA Panel Diaphragms," Technical Note American Plywood Association No. N370B, American Plywood Association (Tacoma, Washington U.S.A.), total of p. 1, printed both sides (Revised Nov. 1993).
American Plywood Association, "Materials Handling," APA The Engineered Wood Association Industrial Use Guide, American Plywood Association (Tacoma, Washington U.S.A.), front cover, numbered pp. 3-54, back cover (Revised Jan. 1995).
American Plywood Association, "The Produce Protector Making a Case for Plywood Harvest Bins," APA The Engineered Wood Association, American Plywood Association (Tacoma, Washington U.S.A.), total of 1 page printed both sides ( May 1, 1996).
American Plywood Association, "A Test of Time Plywood Harvest Bins Span Three Decades in Use," APA The Engineered Wood Association, American Plywood Association (Tacoma, Washington U.S.A), total of 1 page, printed both sides (Nov. 1996).
American Plywood Association, "APA Collapsible Bin Design and Fabrication," APA The Engineered Wood Association, American Plywood Association (Tacoma, Washington U.S.A.), front cover, numbered pp. 2 and 3, back cover, (Feb. 1997).
American Plywood Association, "Plywood for Tabacco Storage," APA The Engineered Wood Association, American Plywood Association (Tacoma, Washington U.S.A.) total of 1 page, (at least as early as 1997).
Provisional Application, "Shear Panel Joint," filed May 9, 1997, Charles H. Utzman, total of 13 pages (printed both sides).
Alfred D. Commins and Robert C. Gregg, "Cyclic Performance of Tall-Narrow Shearwall Assemblies," total of 6 pages (printed on both sides), (Apr. 5, 1994).
Forest Products Society, "Earthquake Performance and Safety of Timber Structures," Forest Products Society (Madison, WI), title, preface and copyright page, pp. 142-146 (1997).
Donald E. Breyer, "Design of Wood Structures," 3rd Ed., Chapter 8, Plywood and Other Structural-Use Panels, McGraw-Hill, Inc. (New York, NY U.S.A.), front page, back page. and p. 434.
Simpson Strong-Tie Company, Inc., "Wood Construction Connectors," Catalog C-97, Simpson Strong-Tie Company, Inc. (U.S.A.), front page, back page and p. 53, (Jan. 1, 1997).
Typical CS Installation as a Floor-to-Floor Tie with Strap Attached Over Plywood, total of 1 page.
Donald E. Breyer, "Design of Wood Structures," 3rd Ed., Chapter 10, Shearwalls, McGraw-Hill, Inc. (New York, NY U.S.A), front page, back page, and p. 497-532.

Donald E. Breyer, "Design of Wood Structures," 3rd Ed., Chapters 8, 9, 11, 12.1 and 12.9, McGraw Hill, Inc. (New York, NY, USA) front and back page, total of 49 pages (printed on both sides).
Bulldog A/S, Bulldog Timber Connectors, "Develop Full Strength of Timber Members at Connections", date-unknown, (Oslo, Norway), (total of 2 pages, double sided).
Bulldog Steel Safety Timber Connectors by Theodorsen, C. E., 1938, (Oslo, Norway), (total of 4 pages, double sided).
Hurri-Bolt Uplift Solutions, "The Truss Tie-Down That Will Blow You Away", Engineering Manufacturing & Installation, SBCCI Report #9910, at least as early as Jul. 28, 1999 (Tampa, FL, U.S.A.), (total of 6 pages, double sided).
ICBO Evaluation Service, Inc., Evaluation Report ER-5467, "Fasteners—Wood Hangers and Framing Anchors", Nov. 1, 1998, (Whittier, CA, U.S.A.), (total of 2 pages, double sided).
ICBO Evaluation Service, Inc., Evaluation Report PFC-5342, "Design—Steel", Sep. 1, 1999, (Whittier, CA, U.S.A.), (total of 6 pages, double sided).
MBR Systems, "Typical Component Installation Details", Jun. 9, 1993, (South San Francisco, CA, U.S.A.), (total of 4 pages, double sided).
Probolt, "Structural Tie Down System", Listed SBCCI PST & ESI No. 9916, at least as early as Jul. 28, 1999, (Orlando, FL, U.S.A.), (total of 8 pages, double sided).
Seismic Solutions structural tie downs, "Quake-Tie", The Superior Hold-Down Solution, Jan. 20, 1997, (Glenn Ellen, CA, U.S.A.), (total of 5 pages, double sided).
Simplified Structural Systems, "Maker of the Hardy Frame", Sep. 1, 1999, (Ventura, CA, U.S.A.), (total of 6 pages, double sided).
Simpson Strong-Tie Company, Inc., "Strong-Wall Shearwall", ICBO Code No. PFC-5485, 1999, (U.S.A.), (pp. 1-6).
Simpson Strong-Tie Company, Inc., "Strong-Wall Shearwall", ICBO ER PFC 5485, 2001, (U.S.A.), (total of 10 pages, double sided).
Simpson Strong-Tie Company, Inc., Catalog C-96, "MKP, LBP/BP, RFB", 1995, (U.S.A.), (p. 19).
The Journal of Light Construction, "Heating System Makeup Air", Dec. 1999, (U.S.A.), (front cover, pp. 4, 5, 50-53).
Zwall, Every Home Needs Z-Walls, "The Strongest Shear Wall in the Smallest Space", date unknown, (U.S.A.), (total of 2 pages, double sided).
Zwall, Zwall Shear Walls, "Strength Where You Need It", at least as early as Jun. 13, 2001, www.z-wall.com, (total of 2 pages, double sided).
Foliente, G.C., ed. *Earthquake Performance and Safety of Timber Structures*. Forest Products Society. Madison, Wisconsin. 1997. (See in particular: Karalic, M. "Analysis of Performance of Floors and Shear Walls with the New Engineered Bracing Systems," pp. 115-124 and Commins, A. et al., "Effect of Hold-Downs and Stud-Frame Systems on the Cyclic Behavior of Wood Shear Walls," pp. 142-146) .
Simpson strong-tie company, inc., "LTP/A34/A35 Framing Anchors," Simpson Strong-Tie Connectors, Simpson Strong-Tie Company, Inc. (USA), numbered p. 58 (1995).
Utzman, Charles H. Provisional Patent Application entitled, "Shear Panel Joint".
Affidavit of Karen Colonies Regarding Testing of Third Party Products by Simpson Strong-Tie.
Patty Christofferson, Tests of Narrow Plywood Shear-wall Panels Reveal Lack of Rigidity of Hold-down Anchorage, Structural Engineer's Association of Northern California Research Committee—Research Bulletin Board, Jan. 1994, B-1, BB94-1, Structural Engineers Association of Northern California, San Francisco, CA.
Cyclic Testing of Narrow Plywood Shear Walls, ATC R-1, 1995, Applied Technology Council, Redwood City, CA.
Office Action dated Aug. 12, 1997, U.S. Appl. No. 10/705,662.
Office Action dated Jan. 23, 2009, U.S. Appl. No. 08/975,940.
Lee W. Mueller, *Corrugated Diaphragm Shear Panel*, U.S. Appl. No. 60/215,290, filed Jun. 30, 2000.
Craig J. Miller, Light Gage Steel Infill Panels in Multistory Steel Frames, *Engineering Journal*, 1974, pp. 42-47, $2^{nd}$ Quarter, American Institute of Steel Construction, Chicago, Illinois, United States.
Yasuhiko Takahashi, Toshikazu Takeda, Yasushi Takemoto, Masatoshi Takagi, *Experimental Study on Thin Steel Shear Walls and*

*Particular Steel Bracings under Alternative Horizontal Load*, Reports of the Working Commissions, Symposium: Resistance and Ultimate Deformability of Structures Acted on by Well Defined Repeated Loads, 1973, pp. 185-190, vol. 13, International Association for Bridge and Structural Engineering, Lisboa, Spain.

Vincent Caccese, Mohamed Elgaaly, Ruobo Chen, *Experimental Study of Thin Steel-Plate Shear Walls under Cyclic Load*, Journal of Structural Engineering, Feb. 1993, pp. 573-587, vol. 119, No. 2, American Society of Civil Engineers, Reston, Virginia, United States.

Mohamed Elgaaly, Yinbo Liu, *Analysis of Thin-Steel-Plate Shear Walls*, Journal of Structural Engineering, Nov. 1997, pp. 1487-96, vol. 119, No. 11, American Society of Civil Engineers, Reston, Virginia, United States.

Mohamed Elgaaly, Vincent Caccese, C. Du, *Postbuckling Behavior of Steel-Plate Shear walls Under Cyclic Loads*, Journal of Structural Engineering, Feb. 1993, vol. 119, No. 2, American Society of Civil Engineers, Reston, Virginia, United States.

Mohamed Elgaaly, Vincent Caccese, *Steel Plate Shear Walls*, Proceedings of the 1990 National Steel Construction Conference, copyright 2003, pp. 4-1—4-28, American Institute of Steel Construction, Chicago, Illinois, United States of America.

Chen, W.F., Handbook of Structural Engineering, 1997, pp. 1-1through 1-27, 2-1 through 2-7, 2-117 through 2-164, 3-1 through 3-4, 3-49, 3-50, 5-1 through 5-83, 7-49 through 7-53, 8-5, 8-6, 19-1 through 19-23, CRC Press LLC, Boca Raton.

* cited by examiner

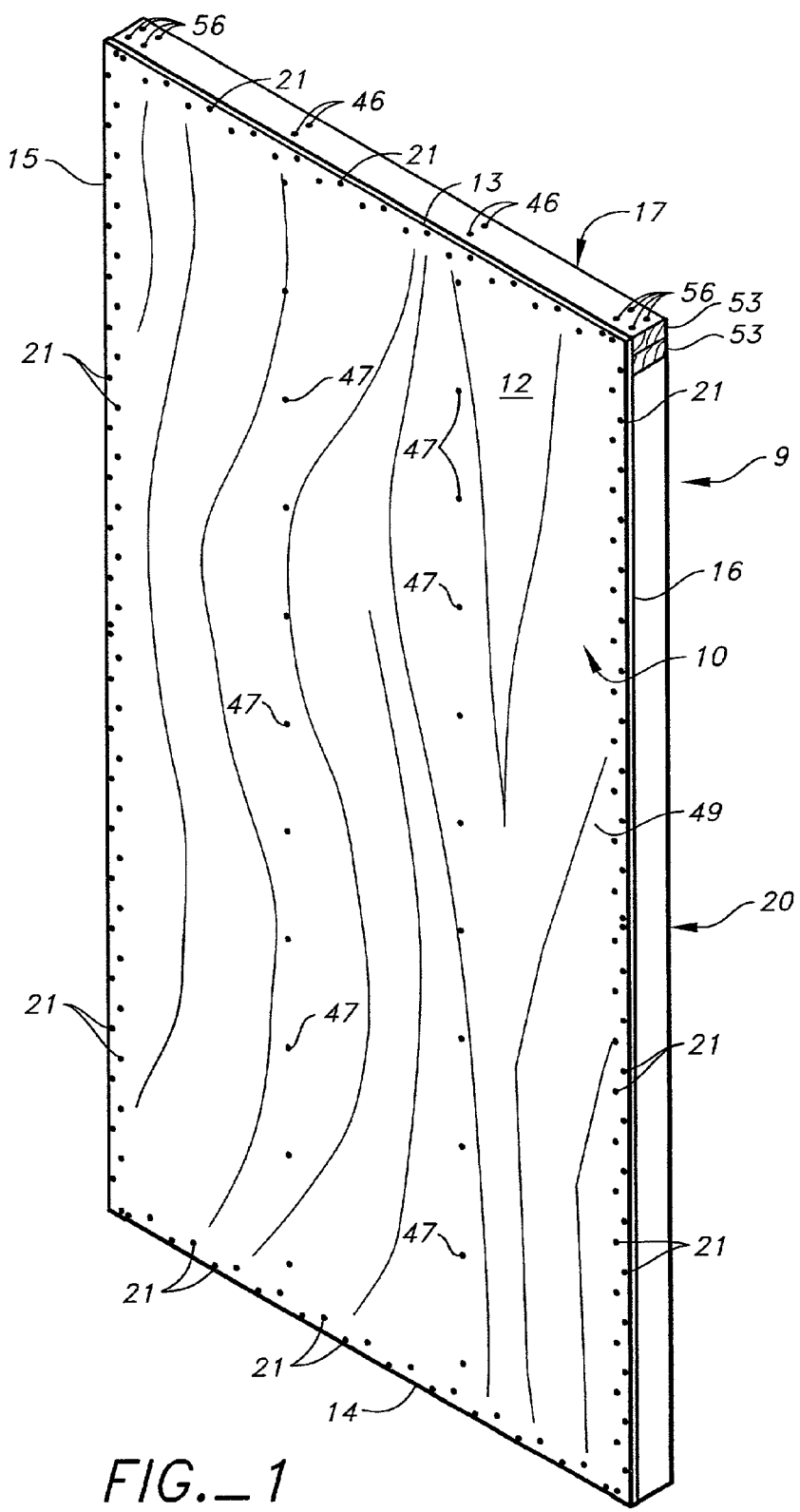
FIG._1

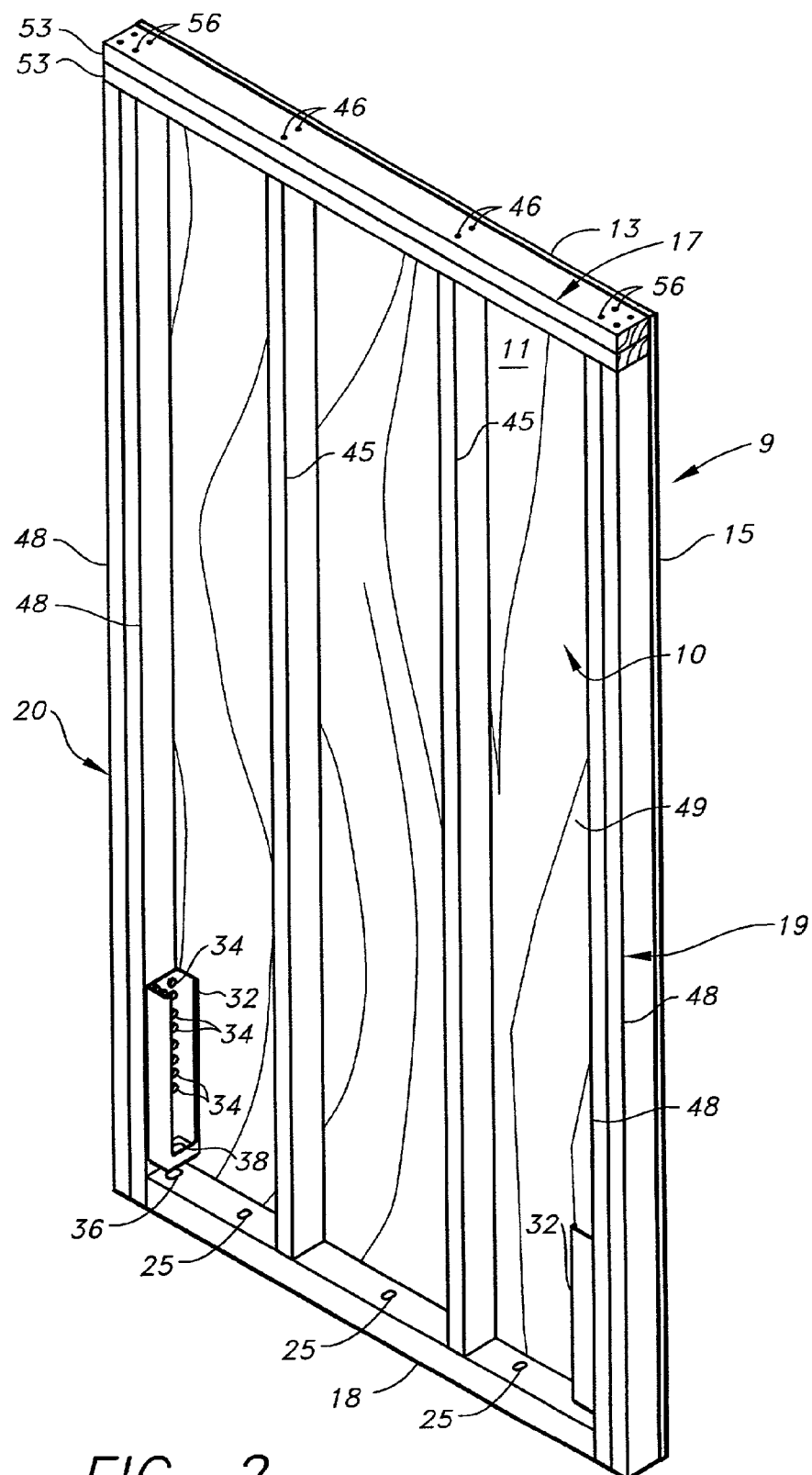
FIG._2

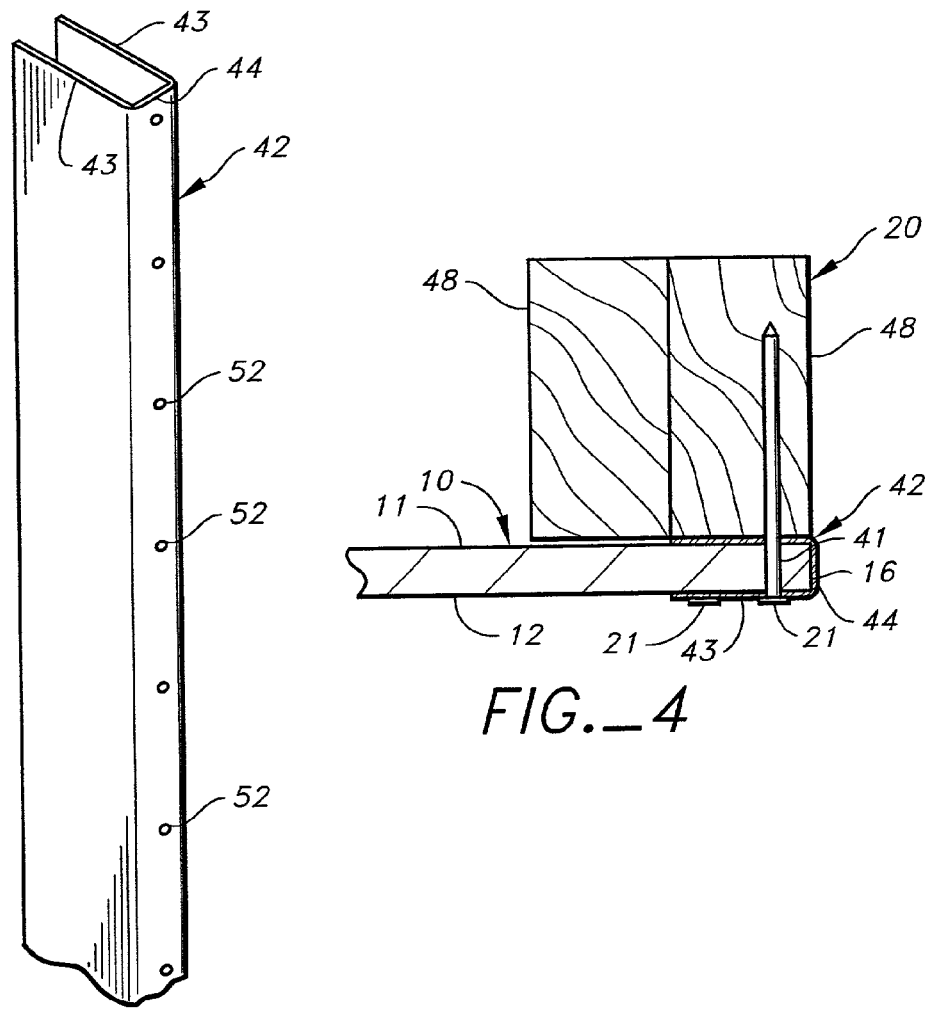
FIG._3
FIG._4
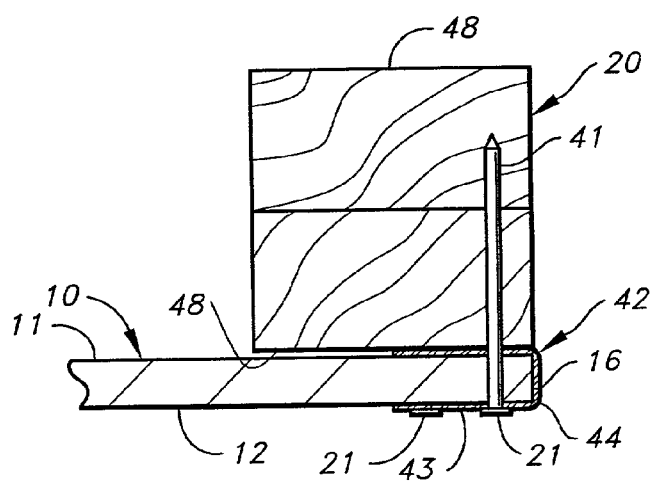
FIG._5

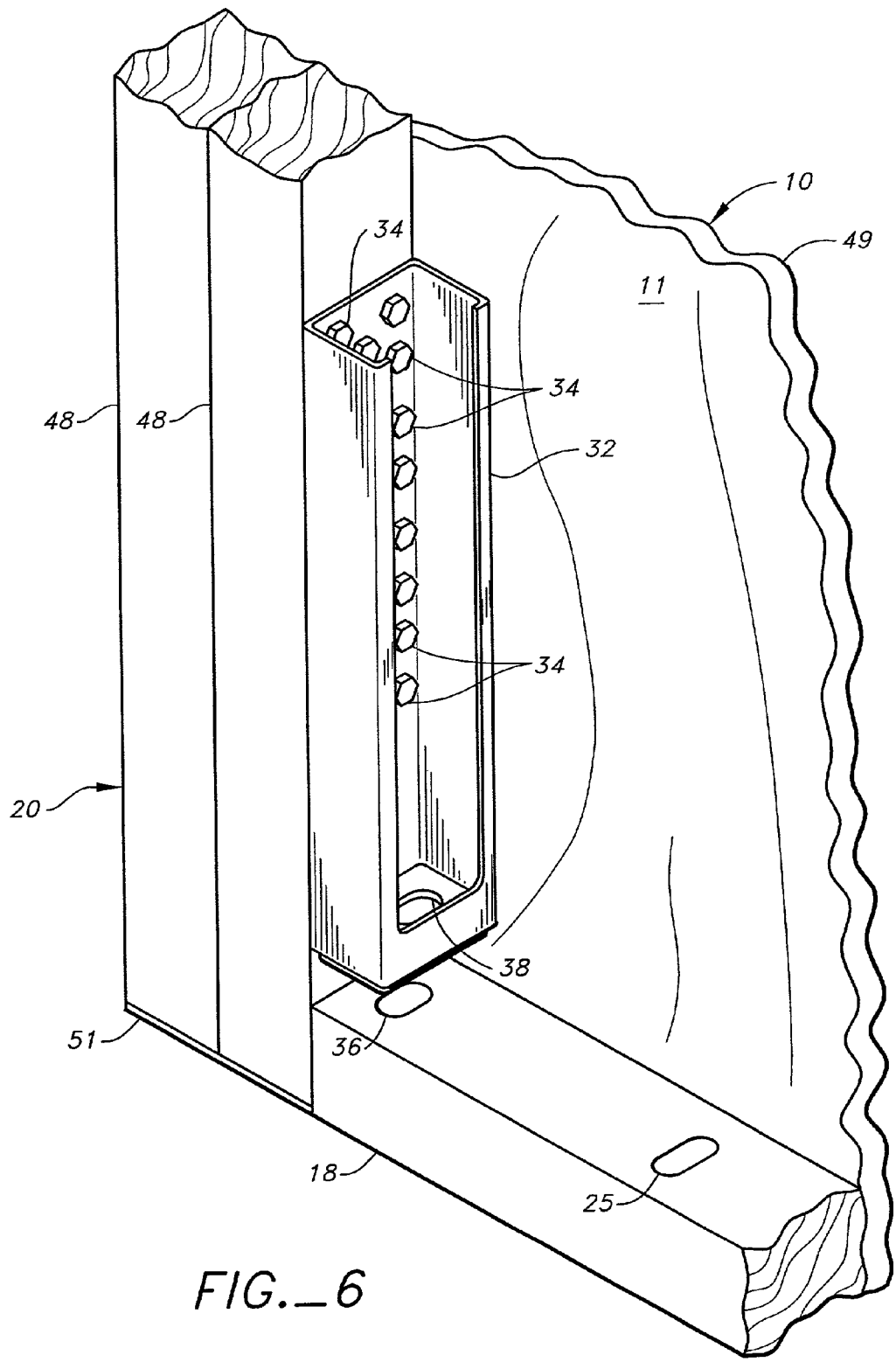
FIG._6

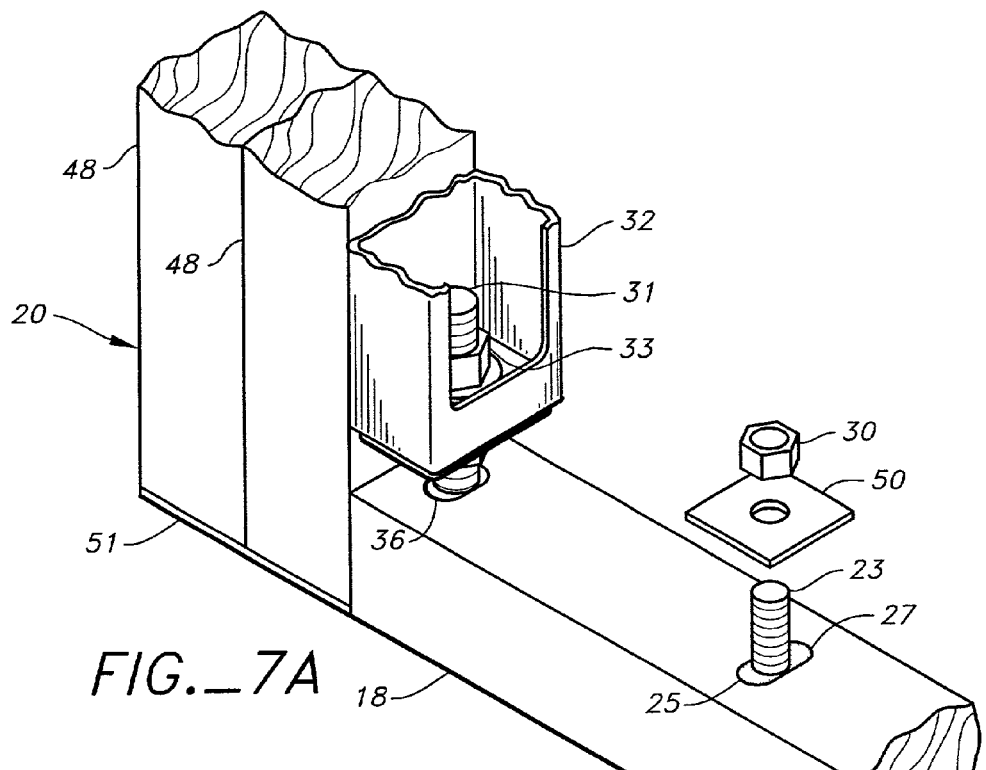
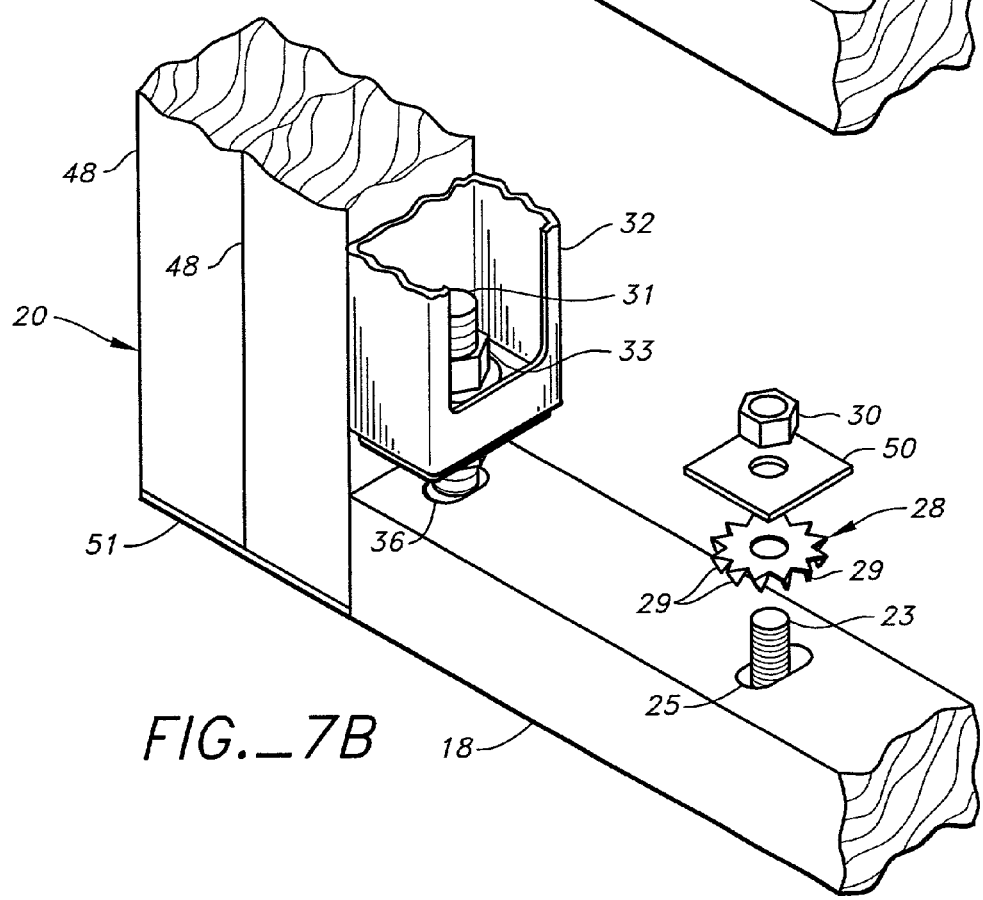

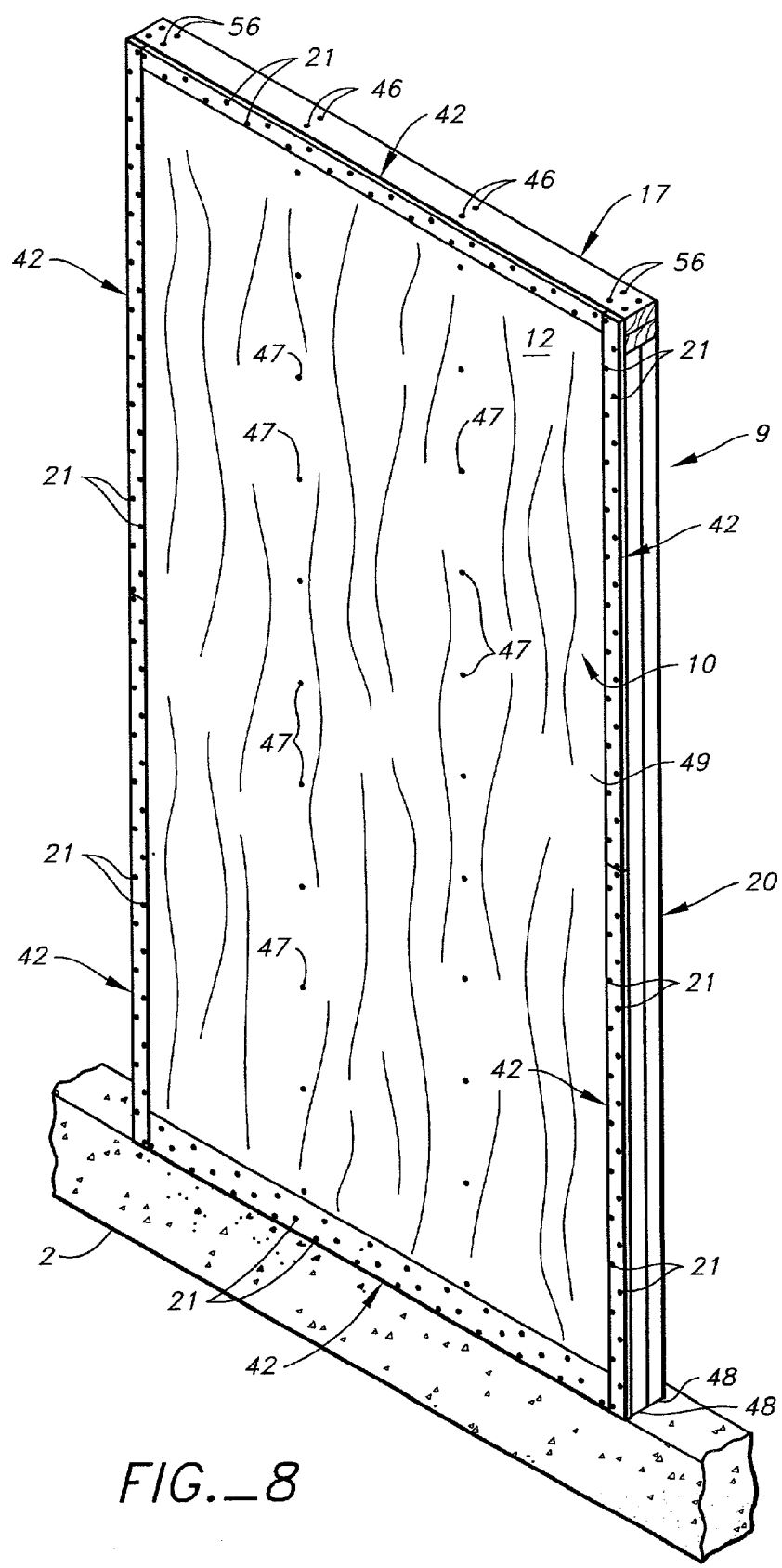
FIG._8

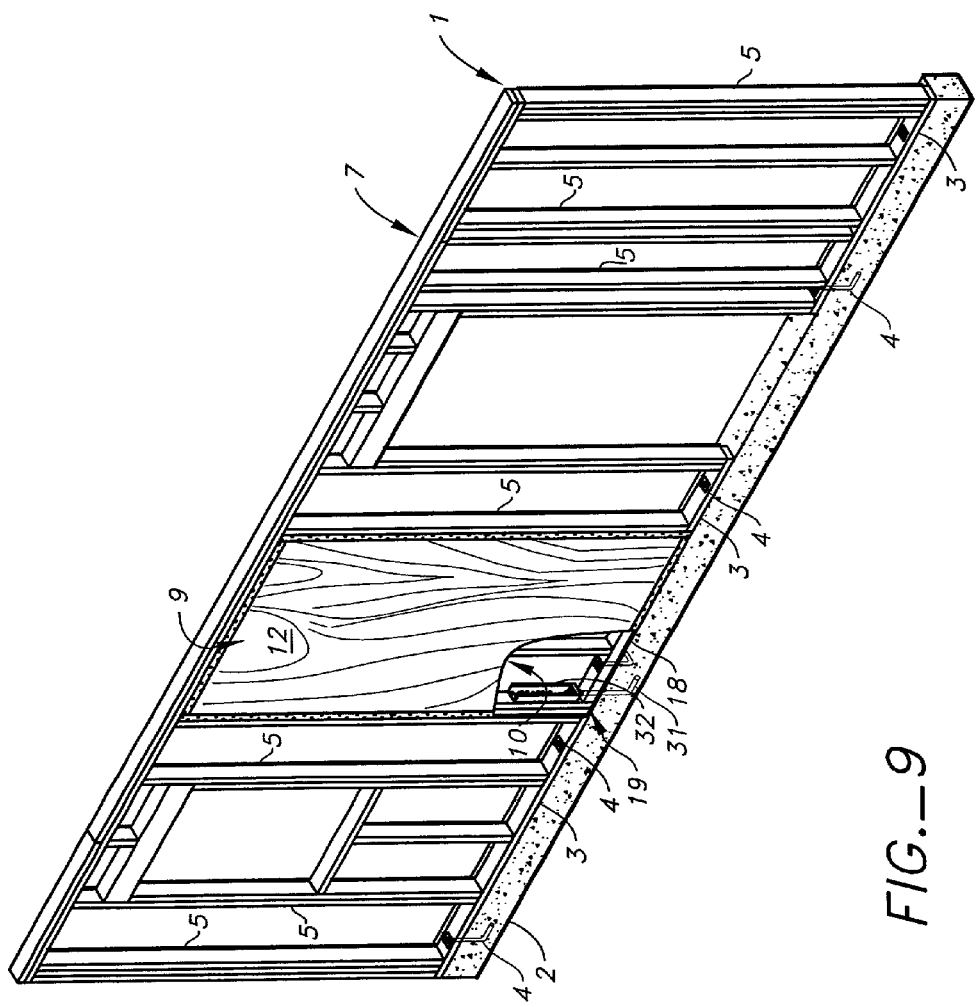
FIG._9

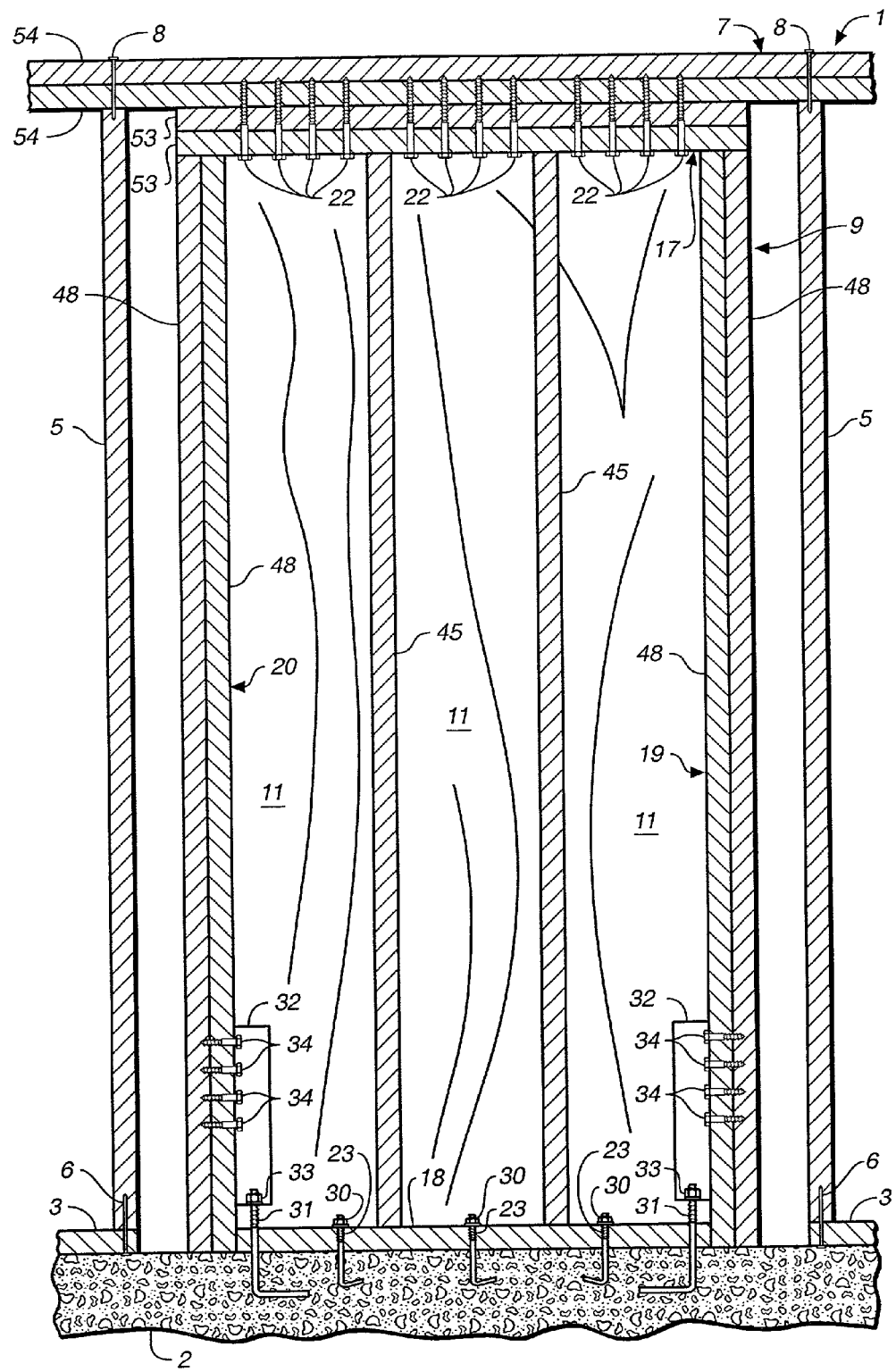
FIG._10

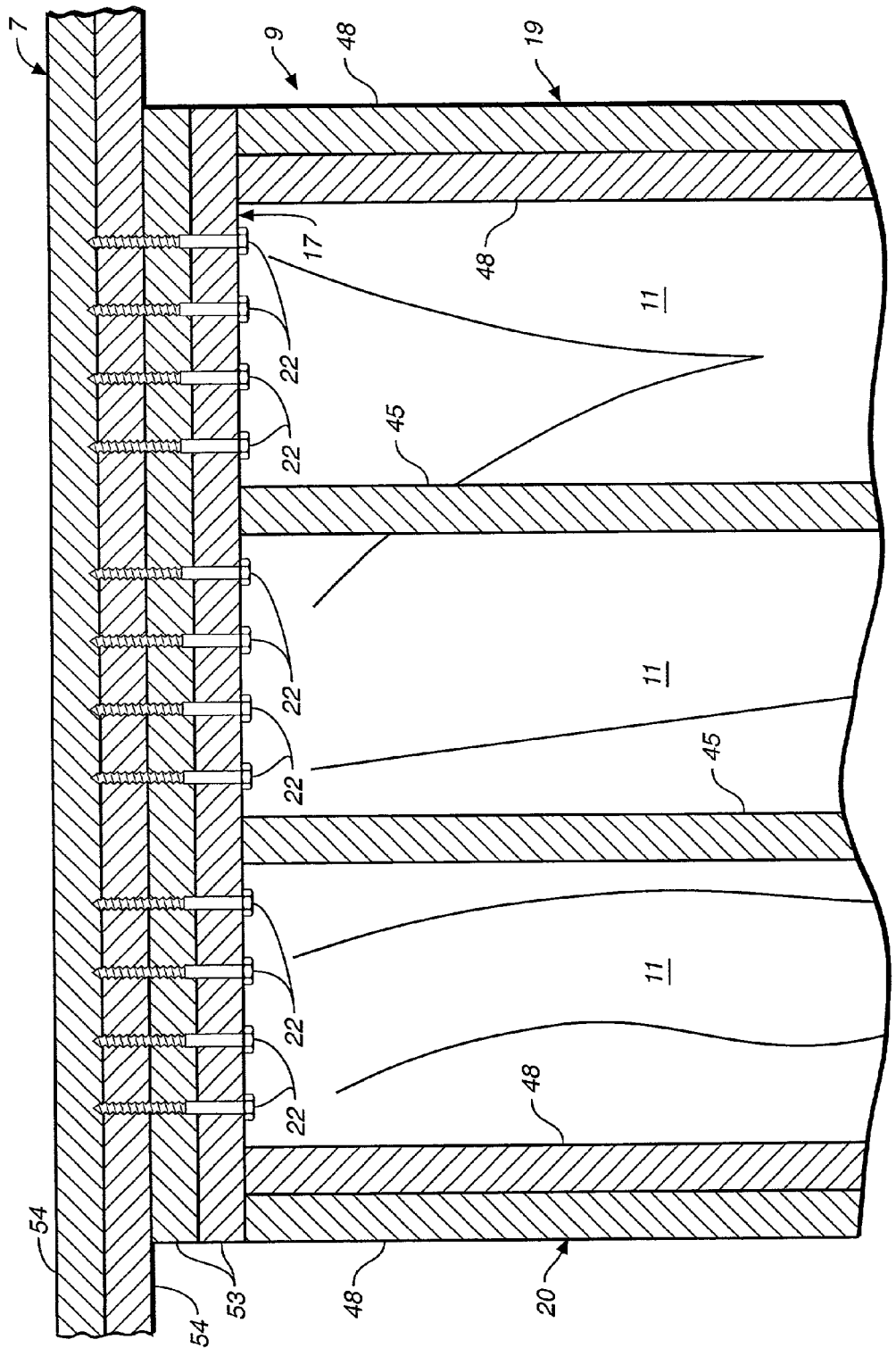

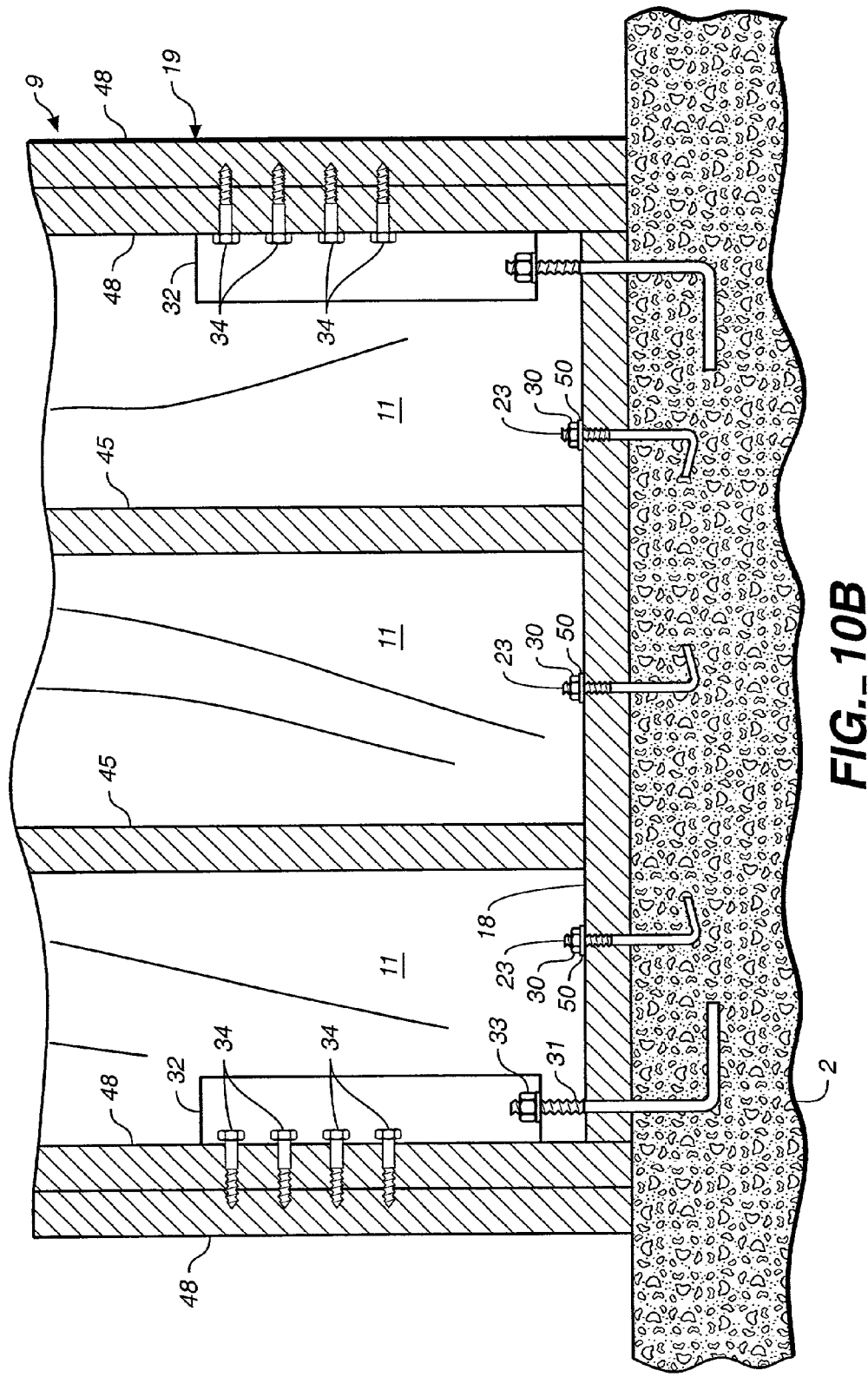
FIG._10B

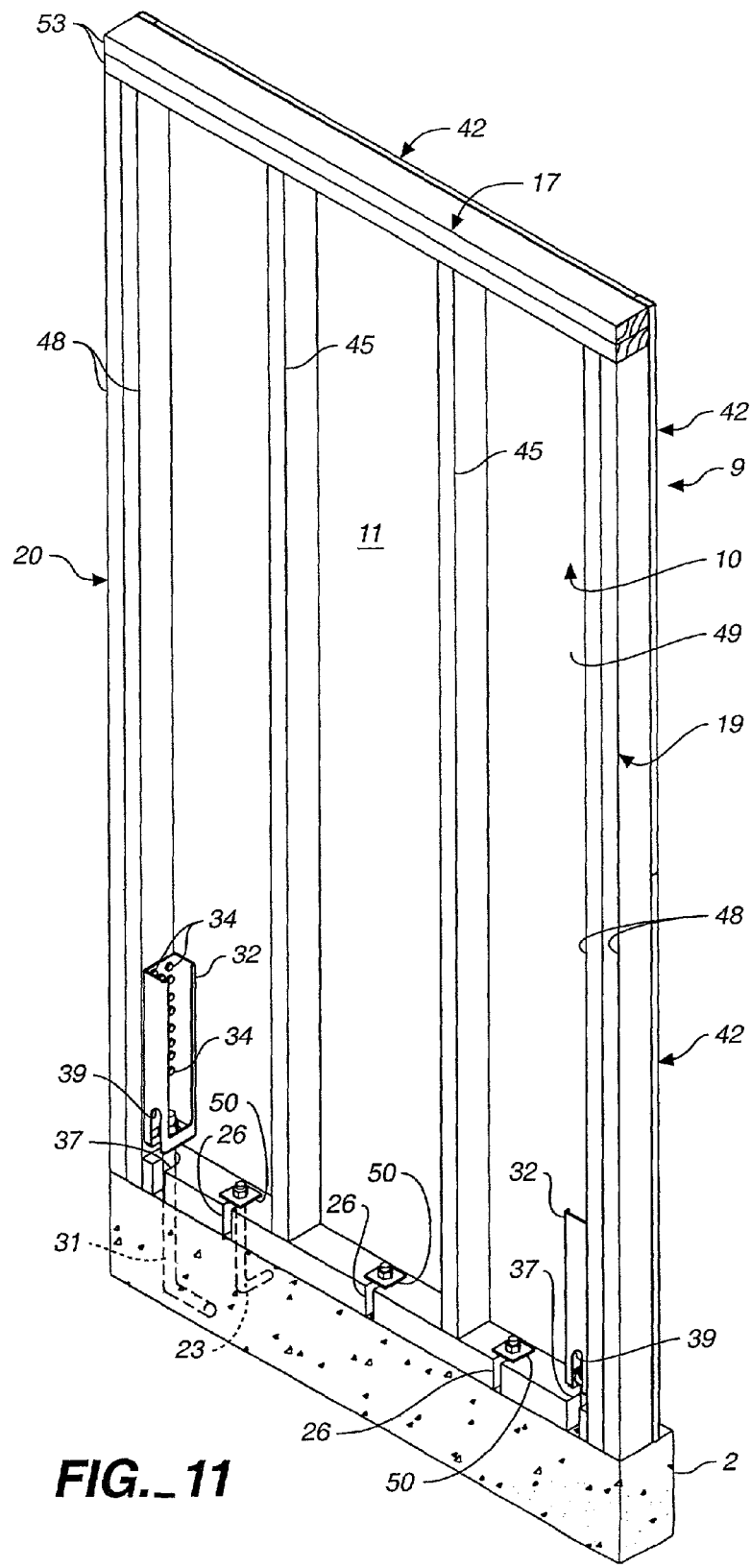
FIG._11

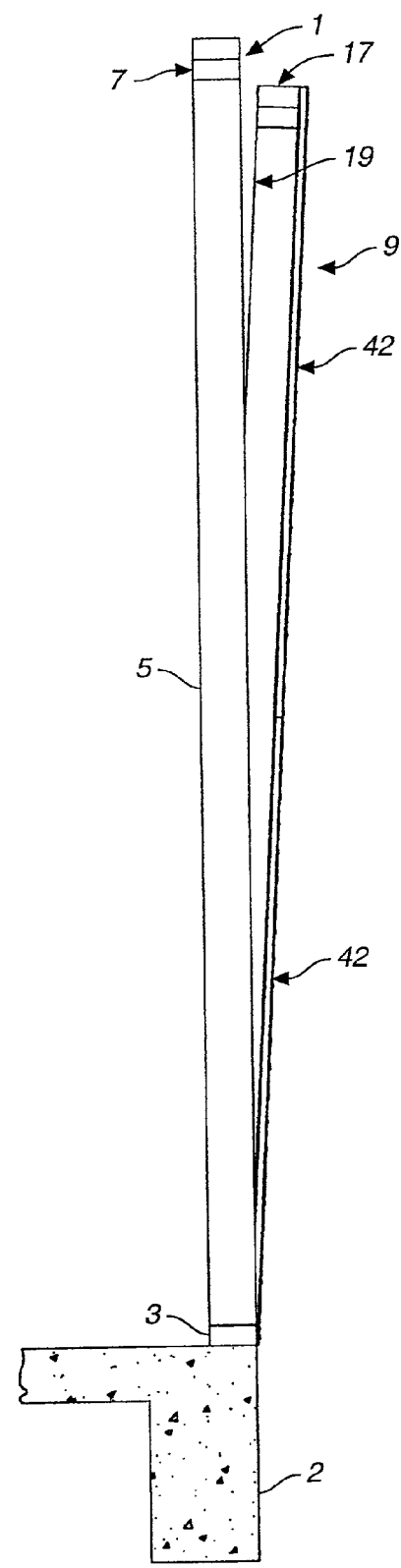
FIG._12

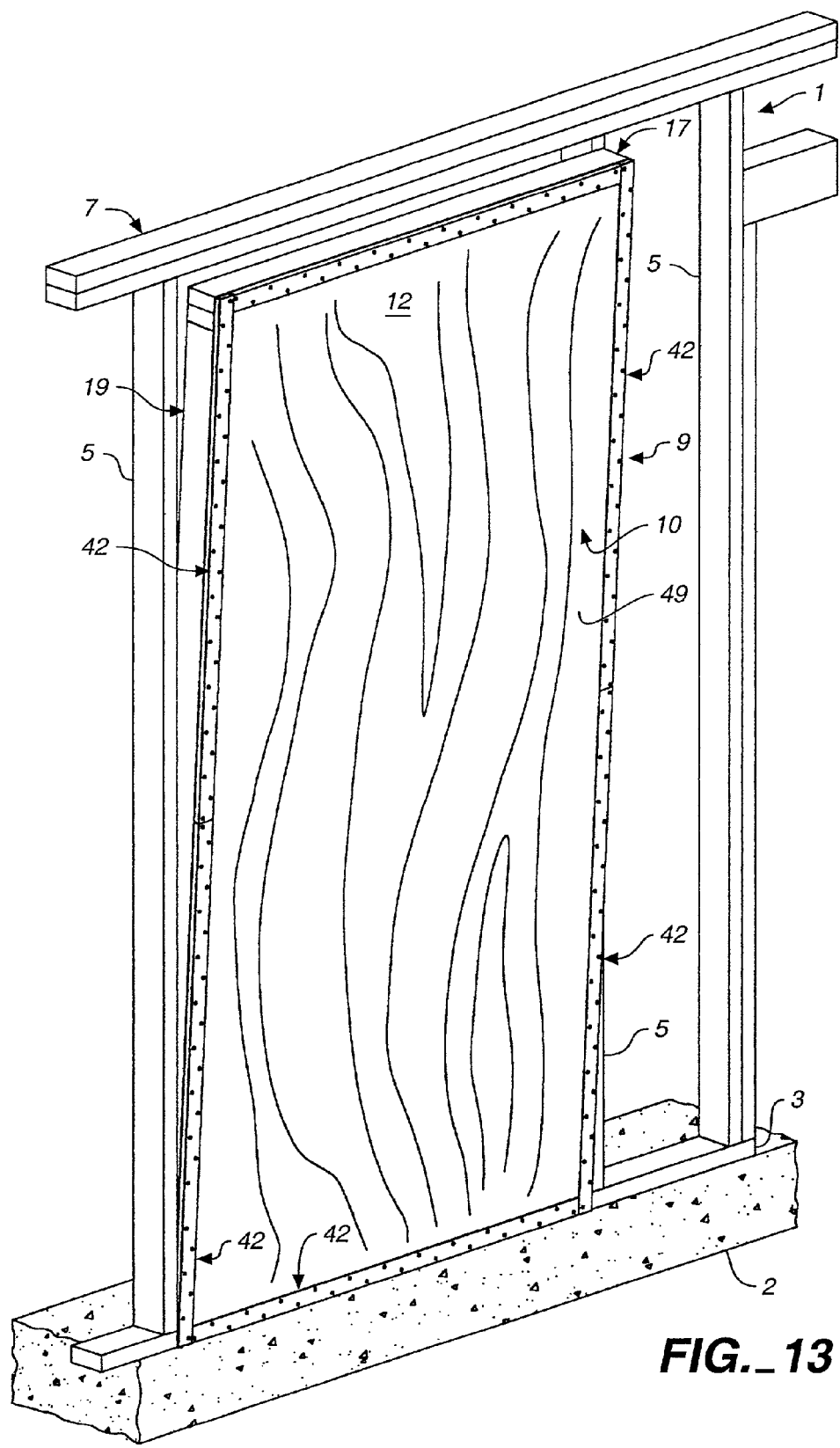
FIG._13

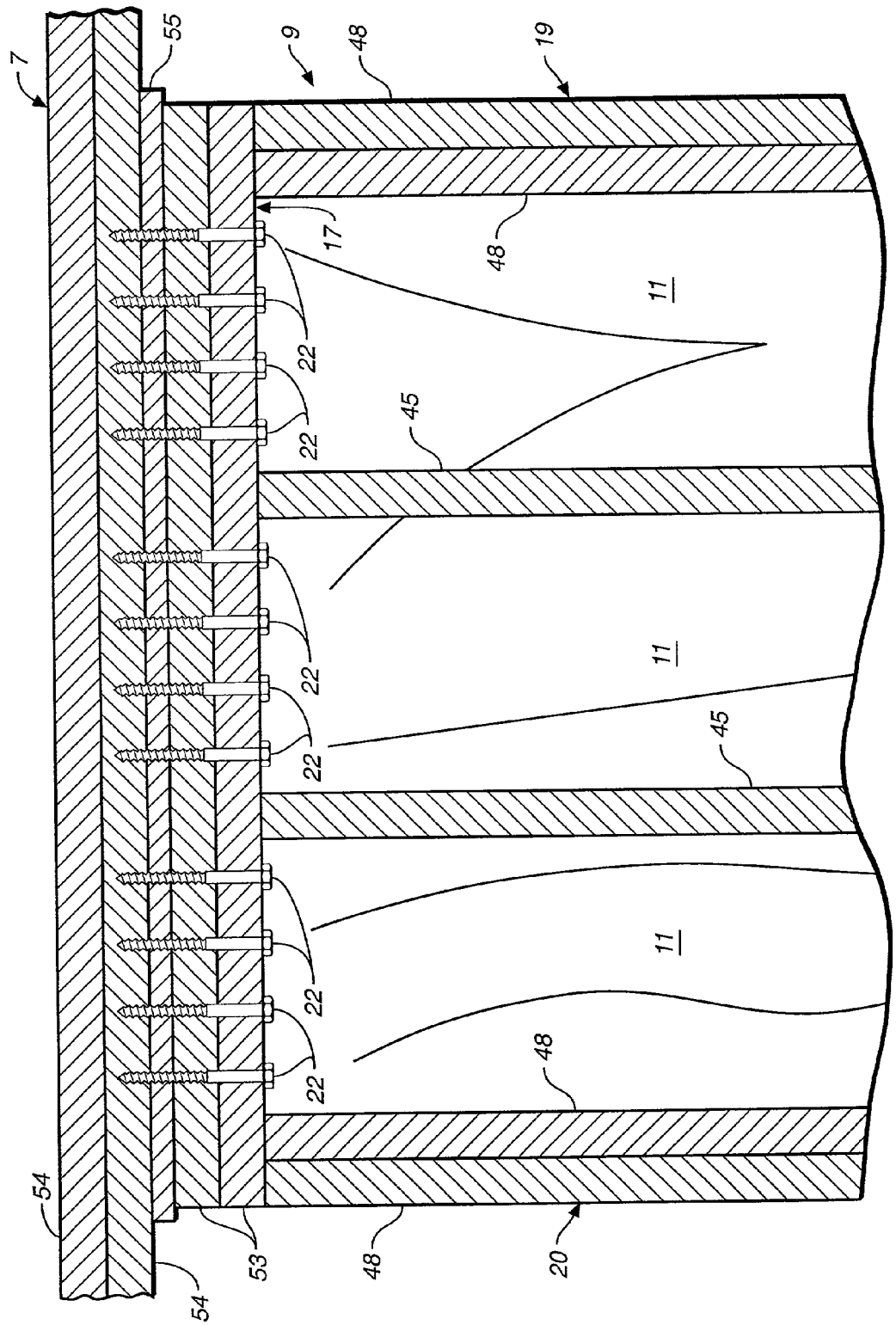
FIG._14

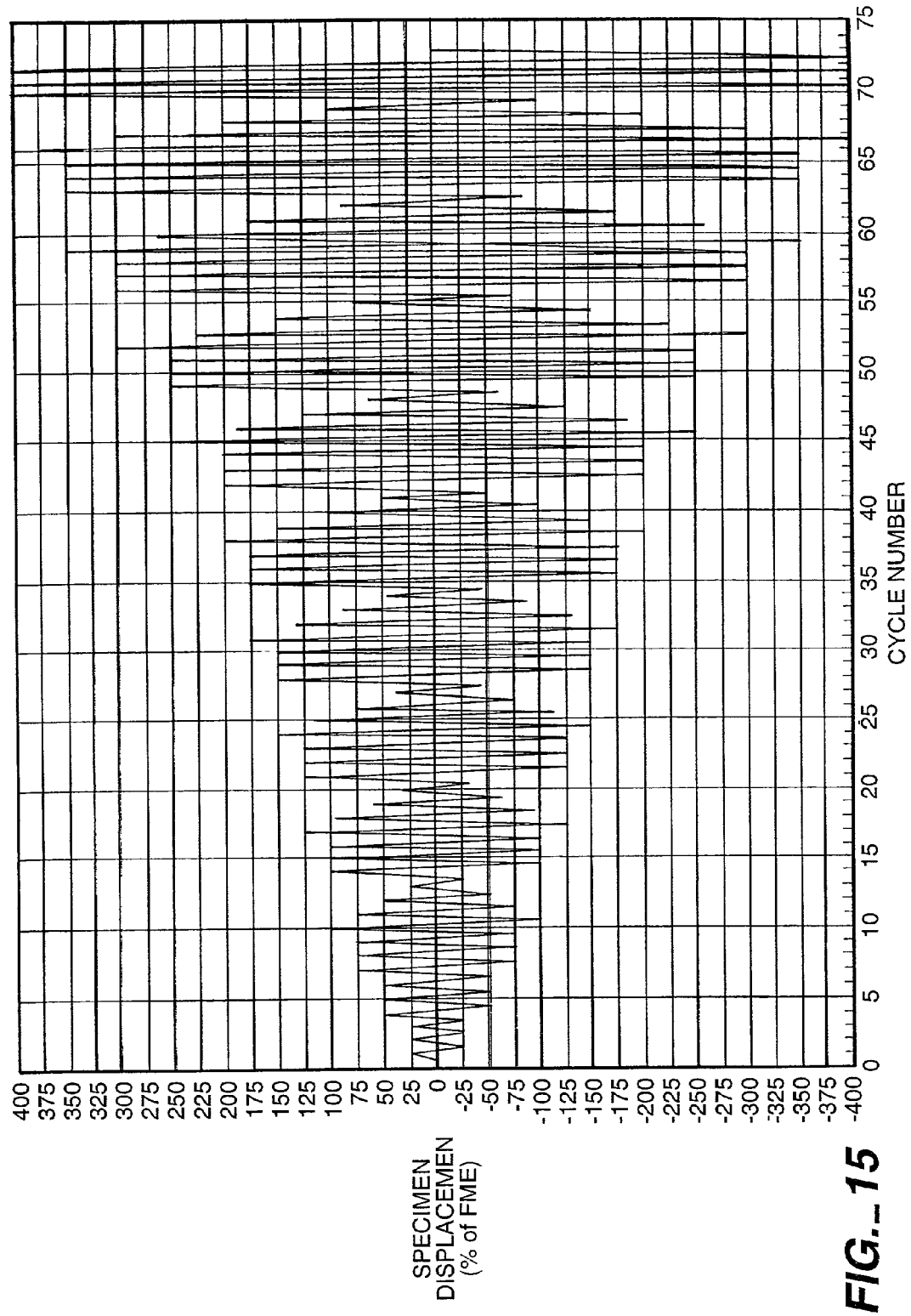
FIG._15

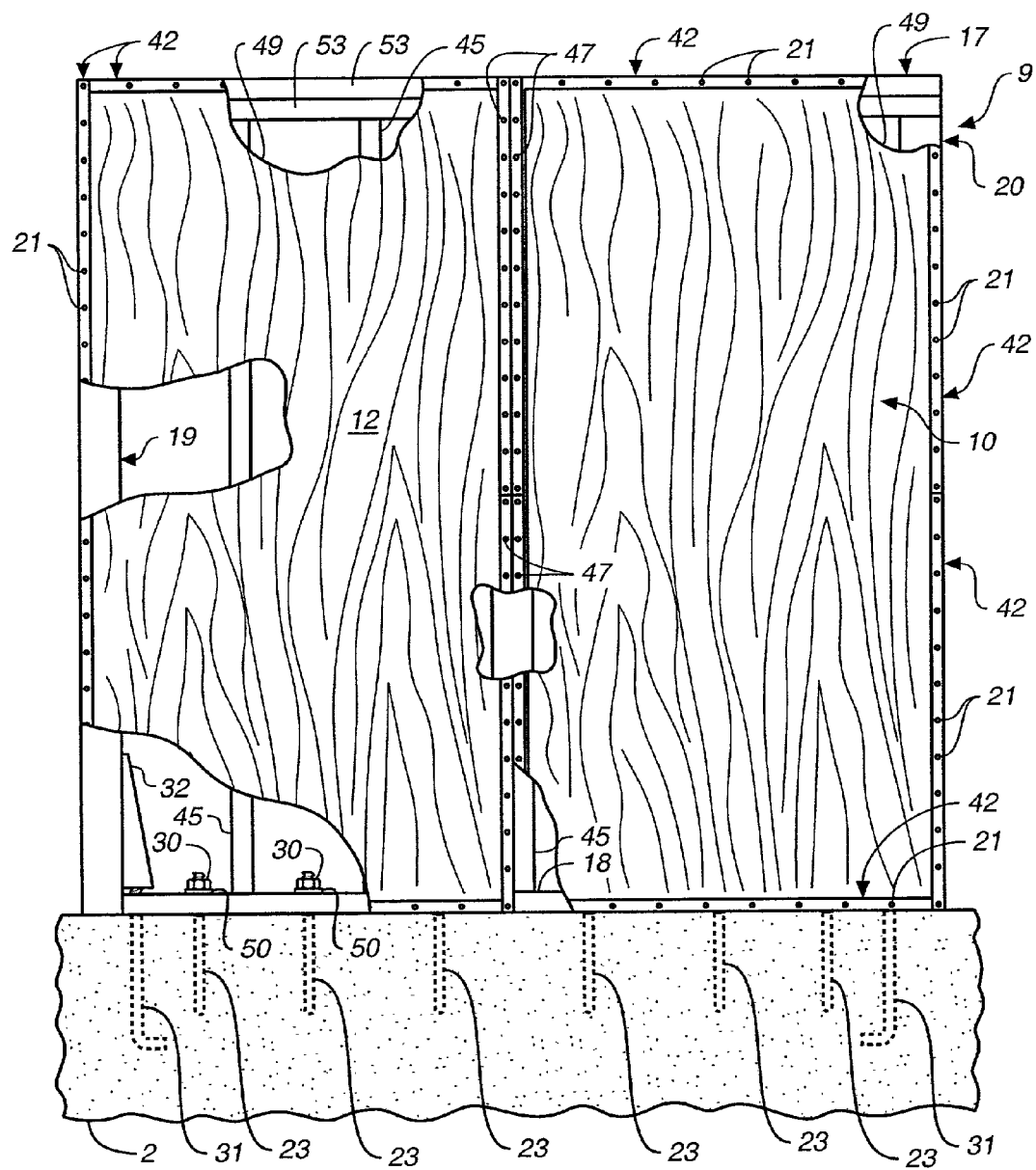
FIG._16

BUILDING WALL FOR RESISTING LATERAL FORCES

This application is a continuation of pending U.S. patent application Ser. No. 08/975,940, filed Nov. 21, 1997.

BACKGROUND

This invention relates to an improved wall for resisting lateral forces imposed on a building incorporating the improved wall. Specifically, this invention relates to a wall in a light-frame building having within it a sub-component specifically designed to resist lateral forces imposed on the building such as those caused by an earthquake or by wind loading. The present invention improves on precedent wall designs in light-frame construction by providing a structure that the designer can confidently predict will resist the lateral forces for which it is designed.

All structures must be designed to resist lateral forces. Current methods for improving the lateral resistance of light-frame construction walls have focused on adding components to a wall built according to conventional practices. In light-frame construction, the simplest such wall consists of a bottom plate, studs resting on and connected to the bottom plate, and a top plate resting on and connected to the studs. Openings for windows and doorways may be incorporated into the light-frame wall.

One of the earliest methods for bracing a wall against lateral forces was to incorporate bracing into the frame of the wall in the form of diagonal bracing members. Another simple means of providing lateral resistance was to provide sheathing to the frame. Plywood sheathing and Oriented Strand Board are common sheathing materials used today in conventional light-frame construction.

As light-frame construction design became more sophisticated, foundation anchors were added to connect the bottom plate of the wall to the foundation to prevent the wall from slipping off the foundation. Later on it was realized that certain walls were light enough to lift up under moment reactions caused by lateral forces and so needed to be further anchored with brackets called holdowns, which attach to the studs of the wall and to bolts set into the foundation.

With proper design and installation, these conventional methods of providing lateral resistance by applying sheathing, foundation anchors and anchored holdowns to conventional walls can provide acceptable resistance to most lateral forces. However, proper installation can be a problem using conventional methods. The division of labor on job cites can result in improper connections. Furthermore the installer may cut corners and sacrifice resistance to lateral forces in return for ease of installation or aesthetic considerations.

The present invention improves on conventional methods for providing lateral resistance by minimizing the possibility of variation in the installation of the component that will be responsible for providing lateral resistance.

OBJECTS OF THE INVENTION

It is an object of the present invention to provide a wall in a building that, as installed, can achieve specific design loads for resisting lateral forces on the wall.

It is an object of the present invention to provide a wall able to resist shearing forces on a building that is easy and economical to construct.

BRIEF DESCRIPTION OF THE DRAWINGS

FIG. 1 is a perspective view of the shear-resisting assembly of the present invention, showing the distal face of the shear-resisting element.

FIG. 2 is a perspective view of the shear-resisting assembly of the present invention, showing the proximal face of the shear-resisting element.

FIG. 3 is a perspective view of a portion of a boundary edging member of the present invention.

FIG. 4 is a top, sectional view of a portion of a shear-resisting assembly made according to the present invention, showing the shear-resisting element attached to the second chord by means of nails. A boundary edging member is shown embracing the second side edge of the shear-resisting element.

FIG. 5 is a top, sectional view of a portion of a shear-resisting assembly made according to the present invention, showing the shear-resisting element attached to the second chord by means of nails. A boundary edging member is shown embracing the second side edge of the shear-resisting element.

FIG. 6 is a perspective view of a portion of the shear-resisting assembly made according to the present invention. A first holdown is shown attached to the first chord by means of holdown fasteners. The first chord is shown with a standoff plate.

FIG. 7A is a perspective view of a portion of the shear-resisting assembly made according to the present invention. Also shown are a foundation anchor and a first anchor bolt that attaches the shear-resisting assembly to the underlying structural component. The slotted opening for the foundation anchor in the bottom strut is shown filled with epoxy.

FIG. 7B is a perspective view of a portion of the shear-resisting assembly made according to the present invention. Also shown are a foundation anchor and a first anchor bolt that attaches the shear-resisting assembly to the underlying structural component. A toothed plate is also shown that fits over the foundation anchor.

FIG. 8 is a perspective view of the shear-resisting assembly of the present invention, showing the distal face of the shear resisting element. The shear-resisting assembly is shown resting on the underlying structural component. The shear-resisting assembly is shown with boundary edging members.

FIG. 9 is a perspective view of a wall built according to the present invention. A portion of the shear-resisting element is shown cut away to reveal a second holdown attached to the second chord of the shear-resisting assembly.

FIG. 10 is a front, cross-sectional view of a portion of a wall built according to the present invention.

FIG. 10A is a front, cross-sectional view of a portion of a wall built according to the present invention, showing the upper portion of the shear-resisting assembly.

FIG. 10B is a front, cross-sectional view of a portion of a wall built according to the present invention, showing the lower portion of the shear-resisting assembly.

FIG. 11 is a perspective view of the shear-resisting assembly of the present invention attached to the underlying structural component by means of foundation anchors and first and second anchor bolts. The proximal face of the shear-resisting element is shown. The bottom strut is shown with notched openings.

FIG. 12 is a side view of a wall of the present invention under construction. The shear-resisting assembly is shown being tilted into the wall.

FIG. 13 is a side view of a portion of a wall of the present invention under construction. The shear-resisting assembly is shown being tilted into the wall.

FIG. 14 is a front, cross-sectional view of a portion of a wall built according to the present invention, showing the upper portion of the shear-resisting assembly. A shim is shown placed between the top plate of the wall and the top strut of the shear-resisting assembly.

FIG. 15 is a graph showing deflection of a shear-resisting assembly at each cycle, according to the procedure used in testing shear-resisting assemblies made according to the present invention.

FIG. 16 is a front view of the shear-resisting assembly of the present invention, showing the distal face of a shear-resisting element made from a plurality of structural panels.

DESCRIPTION OF THE PREFERRED EMBODIMENT

The present invention relates to an improved wall 1 designed to resist lateral forces imposed on a building incorporating the wall 1. The building has an underlying structural component 2 that supports the wall 1. As shown in FIG. 9, the underlying structural component 2 can be a cement foundation. Often, the wall 1 will not rest on the foundation directly, but rather on a floor diaphragm resting on the foundation. In this case, the underlying structural component 2 becomes the floor diaphragm and the foundation. When the wall 1 occurs at the second or third level of the building, the underlying structural component 2 is the supporting floor diaphragms, lower levels and the foundation of the building.

The wall 1 is formed with a bottom plate 3 that rests on the underlying structural component 2 of the building. The bottom plate 3 is connected to the underlying structural component 2 by means 4 for connecting the bottom plate 3 to the underlying structural component 2 of the building. A plurality of vertically-disposed studs 5 are disposed on top of the bottom plate 3. These studs 5 are connected to the bottom plate 3 by means 6 for connecting the plurality of vertically-disposed studs 5 to the bottom plate 3. A top plate 7 is supported by and rests on the vertically-disposed studs 5. The top plate 7 is connected to the vertically-disposed studs 5 by means 8 for connecting the top plate 7 to the vertically-disposed studs 5.

The wall 1, itself, incorporates a shear-resisting assembly 9 that is connected to the top plate 7 of the wall 1 and is also connected to the underlying structural component 2. These connections allow lateral forces on the top plate 7 of the wall 1 and on the underlying structural component 2 to be transmitted to the shear-resisting assembly 9. The shear-resisting assembly 9 is disposed between the top plate 7 and the underlying structural component 2. The shear-resisting assembly 9 has a planar shear-resisting element 10. The planar shear-resisting element 10, itself, has a proximal face 11, a distal face 12, a top edge 13, a bottom edge 14 and first and second side edges 15 and 16. The shear-resisting assembly 9 includes a top strut 17 connected to the proximal face 11 near the top edge 13 of the shear-resisting element 10. The top strut 17 is disposed substantially parallel to the top plate 7 of the wall 1. The shear-resisting assembly 9 includes a bottom strut 18 connected to the proximal face 11 near the bottom edge 14 of the shear-resisting element 10. A first chord 19 is connected to the proximal face 11 near the first side edge 15 of the shear-resisting element 10. A second chord 20 is also connected to the proximal face 11 near the second side edge 16 of the shear-resisting element 10. The top and bottom struts 17 and 18 and the first and second chords 19 and 20 are connected to the shear-resisting element 10 by means 21 for connecting the top strut 17, the bottom strut 18, the first chord 19 and the second chord 20 to the shear-resisting element 10. The top and bottom struts 17 and 18 and the first and second chords 19 and 20 form a supporting frame for the shear-resisting element 10.

The shear-resisting assembly 9 is connected to the top plate 7 of the wall 1 by means 22 for connecting the shear-resisting assembly 9 to the top plate 7 and is connected to the underlying structural component 2 of the building by means 23 for connecting the shear-resisting assembly 9 to the underlying structural component 2.

In the preferred form of the invention, the bottom plate 3 of the wall 1, the plurality of vertically-disposed studs 5 resting on the bottom plate 3, the top plate 7 of the wall 1, the shear-resisting element 10 of the shear-resisting assembly 9, the top and bottom struts 17 and 18 of the shear-resisting assembly 9, and the first and second chords 19 and 20 of the shear-resisting assembly 9 are all made of wood or wood composites. These members can also be made of steel or synthetic building materials.

As shown in FIG. 9, in the preferred form of the invention, when the underlying structural component 2 is the foundation of the building, the means 4 for connecting the bottom plate 3 to the underlying structural component 2 of the building are foundation anchors in the shape of bolts bent to form a mechanical interlock with the foundation. The inventor has found ⅝" diameter ASTM A307 or A36 foundation anchors embedded to a proper depth to be sufficient for most foundations. The length of the foundation anchors, the spacing between foundation anchors and placement of the foundation anchors in the foundation are determined according to the forces that are imposed on the wall 1 and the strength of the foundation. The means 4 for connecting the bottom plate 3 to the underlying structural component 2 of the building can also be strap anchors, mudsill anchors, bolts, retrofit bolts, foundation plate holdowns, straps, ties or a combination thereof. When the underlying structural component 2 consists of a floor diaphragm and the foundation of the building, the means 4 for connecting the bottom plate 3 to the underlying structural component 2 of the building can be nails, screws, bolts, retrofit bolts, framing anchors, angles, ties, plates, straps or a combination thereof. When the underlying structural component 2 consists of a floor diaphragm, a supporting wall and the foundation, the means 4 for connecting the bottom plate 3 to the underlying structural component 2 of the building can be nails, screws, bolts, foundation bolts, retrofit bolts, framing anchors, angles, ties, plates, straps or a combination thereof. When the underlying structural component 2 consists of a plurality of floor diaphragms, a plurality of supporting walls and the foundation, the means 4 for connecting the bottom plate 3 to the underlying structural component 2 of the building can be nails, screws, bolts, retrofit bolts, framing anchors, angles, ties, plates, straps or a combination thereof.

As shown in FIG. 10, the preferred means 6 for connecting the plurality of vertically-disposed studs 5 to the bottom plate 3 are zinc-coated nails, but screws, adhesives, welds, clips, angles, framing anchors, stud-plate ties, ties, straps or a combination thereof can also be used.

As shown in FIG. 10, the preferred means 8 for connecting the top plate 7 to the vertically-disposed studs 5 are also zinc-coated nails, but screws, adhesives, welds, clips, angles, framing anchors, stud-plate ties, ties, straps or a combination thereof can also be used.

As shown in FIG. 1, the preferred means 21 for connecting the top strut 17, the bottom strut 18, the first chord 19 and the second chord 20 to the shear-resisting element 10 are 10d common 0.148"×3" nails, but screws, welds, clips, ties, brackets, angles staples, adhesives or a combination thereof can also be used. As shown in FIG. 1, nails should usually be spaced 2" apart around the shear-resisting element 10 near the top and bottom edges 13 and 14 and the first and second side edges 15 and 16 to achieve maximum shear resistance without causing splitting of the shear-resisting element 10.

As shown in FIG. 10, the preferred means 22 for connecting the shear-resisting assembly 9 to the top plate 7 of the wall 1 are top plate fasteners having a threaded shank portion, but nails, welds, bolts, straps, brackets, ties, angles, anchor plates, clips, framing anchors or a combination thereof can also be used. The preferred top plate fasteners are ¼"×6" Simpson Strong Drive Screws. The top plate fasteners are inserted through the top strut 17 of the shear-resisting assembly 9 and into the top plate 7 of the wall 1. The number of top plate fasteners is dependent on the lateral loads the shear-resisting assembly 9 is expected to carry and the strength of the top plate fasteners.

As shown in FIG. 10, the preferred means 23 for connecting the shear-resisting assembly 9 to the underlying structural component 2 of the building is a foundation anchor just like the means 4 for connecting the bottom plate 3 of the wall 1 to the underlying structural component 2. The inventor has found three ⅝" diameter ASTM A307 or A36 foundation anchors embedded to a proper depth to be sufficient for anchoring a four foot wide shear-resisting assembly to most foundations. The length of the foundation anchors, the spacing between foundation anchors and placement of the foundation anchors in the foundation are determined according to the forces that are imposed on the shear-resisting assembly 9 and the strength of the foundation. The means 23 for connecting the shear-resisting assembly 9 to the underlying structural component 2 of the building can also be strap anchors, mudsill anchors, bolts, retrofit bolts, foundation plate holdowns, straps, of ties or a combination thereof. When the underlying structural component 2 consists of a floor diaphragm and the foundation of the building, the means for connecting the shear-resisting assembly 9 to the underlying structural component 2 of the building can be nails, screws, bolts, retrofit bolts, framing anchors, angles, ties, plates, straps or a combination thereof. When the underlying structural component 2 consists of a floor diaphragm, a supporting wall, and the foundation, the means 23 for connecting the shear-resisting assembly 9 to the underlying structural component 2 of the building can be nails, screws, bolts, retrofit bolts, framing anchors, angles, ties, plates, straps or a combination thereof. When the underlying structural component 2 consists of a plurality of floor diaphragms, a plurality of supporting walls, and the foundation, the means 23 for connecting the shear-resisting assembly 9 to the underlying structural component 2 of the building can be nails, screws, bolts, retrofit bolts, framing anchors, angles, ties, plates, straps or a combination thereof.

As shown in FIG. 10, in the preferred form of the invention the shear-resisting assembly 9 rests directly on the underlying structural component 2, bypassing the bottom plate 3 of the wall 1.

As also shown in FIG. 10, in the preferred form the first and second chords 19 and 20 of the shear-resisting assembly 9 rest directly on the underlying structural component 2. This prevents the bottom strut 18 from being crushed when moment reactions exert compressive forces on the first 20 and second chords 19 and 20. Because the first and second chords 19 and rest directly on the underlying structural component 2, 20 gauge steel standoff plates 51 are preferably attached to the bottoms of the first and second chords 19 and 20 to serve as a moisture barrier. See FIGS. 6, 7A and 7B. This is accomplished with two 8d nails, end-nailed through the standoff plates 51.

As shown in FIG. 7A, in the preferred form the means 23 for connecting the shear-resisting assembly 9 to the underlying structural component 2 is a foundation anchor anchored to the underlying structural component 2. The foundation anchor is designed to transmit lateral forces imposed on the underlying structural component 2 to the shear-resisting assembly 9.

As shown in FIG. 7A, the bottom strut 18 is formed with an opening through which the foundation anchor passes. Preferably, the opening in the bottom strut 18 is oversized to accommodate mis-installation of the foundation anchor in the underlying structural component 2. As is shown in FIG. 7A, the opening in the bottom strut 18 is preferably a slotted opening 25, the slotted opening 25 being oriented so that the bottom strut 18 can slide horizontally and at right angles to the length of the wall 1. As is shown in FIG. 11, the opening in the bottom strut 18 can also be a notch 26 in the bottom strut 18 that allows the bottom strut 18 to slide into place. A washer 50 and a nut 30 can be added to improve the connection and provide resistance to uplift forces on the shear-resisting assembly 9.

As shown in FIG. 7A, epoxy 27 can be inserted within the opening in the bottom strut 18 to ensure close contact between the foundation anchor and the bottom strut 18.

As shown in FIG. 7B, in the preferred form of the present invention a toothed plate 28, having teeth 29, is used to eliminate play between the bottom strut 18 and the foundation anchor due to the oversized opening in the bottom strut 18 that receives the foundation anchor. The toothed plate 20 receives the foundation anchor and connects to the bottom strut 18 with the teeth 29. A nut 30 is fitted onto the foundation anchor and tightened down, forcing the teeth 29 of the toothed plate 28 into the bottom strut 18. A washer 50 can be added to improve the connection.

As shown in FIG. 10, in the preferred form the shear-resisting assembly 9 also has first and second anchor bolts 31 that are anchored to the underlying structural component 2 and are disposed near the first and second chords 19 and 20. The first and second anchor bolts 31 are received by first and second holdowns 32. Nuts 33, fitted onto the first and second anchor bolts 31, engage the first and second holdowns 32. The first and second holdowns 32 are connected to the first and second chords 19 and 20 by means 34 for connecting the first and second holdowns 32 to the first and second chords 19 and 20.

The first and second anchor bolts 31 should at least be ⅞" diameter ASTM A307 or A36 anchor bolts 31 embedded in the foundation at proper locations and a selected depth to ensure sufficient resistance to the loads the shear-resisting assembly 9 is designed to carry.

As shown in FIG. 7A, the bottom strut 18 is preferably formed with anchor bolt openings through which the first and second anchor bolts 31 pass. Preferably, the anchor bolt openings in the bottom strut 18 are oversized to accommodate mis-installation of the anchor bolts 31 in the underlying structural component 2. The anchor bolt openings in the bottom strut 18 are also preferably slotted openings 36, the slotted openings 36 being oriented so that the bottom strut 18 can slide horizontally and at right angles to the length of the wall 1.

As shown in FIG. 7A, the first and second holdowns 32 are preferably formed with slotted openings 38 that are oriented in the same direction as, and are in general alignment with, the slotted openings 25 in the bottom strut 18 when the first and second holdowns 32 are attached to the first and second chords 19 and 20, the slotted openings 38 receiving the first and second anchor bolts 31.

As shown in FIG. 11, the anchor bolt openings in the bottom strut can also be formed as notches 37 in the bottom strut 18 that allow the bottom strut 18 to slide into place. When the anchor bolt openings in the bottom strut 18 are formed as notches 26 and 37, portals 39 should be formed in the first and second holdowns 32 that allow the shear-resisting assembly 9 to slide into place.

As shown in FIG. 10, the means 34 for connecting the first and second holdowns 32 to the first and second chords 19 and 20 are holdown fasteners having threaded shank portions. Preferably, these holdown fasteners are ¼"×3" Simpson Strong Drive screws, although they can also be bolts, nails, screws or adhesives.

As shown in FIG. 10B, holdown fasteners are preferably inserted only a selected distance into the first and second chords 19 and 20 without passing all the way through the first and second chords 19 and 20. This allows the shear-resisting assembly 9 to fit closely between the studs 5 of the wall 1.

As shown in FIGS. 4 and 5, the means 21 for connecting the top strut 17, the bottom strut 18, the first chord 19 and the second chord 20 to the shear-resisting element 10 are preferably edge fasteners having shank portions 41. Preferably, these edge fasteners are 10d common 0.148"×3" nails. Preferably, the first and second chords 19 and 20 and the top strut 17 are attached to the shear-resisting element 10 by two rows of nails. The rows of nails are spaced ½" apart. Within the rows, the nails are spaced 4" apart. As is best shown in FIG. 8, the nails between rows are staggered approximately 2" apart. Preferably, the bottom strut 18 is attached to the shear-resisting element 10 by three rows of nails. The rows of nails are spaced ½" apart. Within the rows, the nails are spaced 4" apart. Between rows, the nails are staggered approximately 1.3" apart. Nails should be spaced at least 0.357" from the top and bottom edges 13 and 14 and the first and second side edges 15 and 16 of the shear-resisting element 10 to reduce splitting.

As best shown in FIGS. 3, 4 and 5, in the preferred form of the shear-resisting assembly 9, what the inventors call boundary edging members 42 are used to strengthen the connection between the shear-resisting element 10 and the top and bottom struts 17 and 18 and the first and second chords 19 and 20. The boundary edging members 42 are disposed on the shear-resisting element 10 at the top and bottom edges 13 and 14 and the first and second side edges 15 and 16. The boundary edging members 42 are pierced by the shank portions 41 of the edge fasteners.

Preferably, the boundary edging members are u-shaped channels, having a pair of legs 43 joined by a central member 44, that embrace the shear-resisting element 10. The shank portion 41 of each of the edge fasteners passes through the legs 43 of the u-shaped channels. The boundary edging members 42 are preferably formed from galvanized 20 gauge sheet metal. The legs 43 and central member 44 of the boundary edging members 42 can be of varying widths to accommodate various nailing configurations and shear-resisting elements 10 of varying thickness. Preferably, 0.125" diameter holes 52, spaced 1" apart are formed in the central member 44. These holes 52 allow moisture to escape from the top and bottom edges 13 and 14 and first and second side edges 15 and 16 of the shear-resisting element 10.

When the shear-resisting assembly 9 is sufficiently wide, the shear-resisting assembly 9 is preferably made with intermediate studs 45 disposed between the top and bottom struts 17 and 18 of the shear-resisting element 10. These intermediate studs 45 are preferably formed from 1.5"×3" machine stress rated (MSR) Southern Yellow Pine studs. These intermediate studs 45 are connected to the top and bottom struts 17 and 18 by means 46 for connecting the intermediate studs 45 to the top and bottom struts 17 and 18. Preferably, the means 46 for connecting the intermediate studs 45 to the top and bottom struts 17 and 18 are 20d 0.150"×5.5" nails. Also, in the preferred embodiment the intermediate studs 45 of the shear-resisting assembly 9 are connected to the shear-resisting element 10 by means 47 for connecting the intermediate studs 45 to the shear-resisting element 10. As best shown in FIG. 1, in the preferred form the means 47 for connecting the intermediate studs 48 to the shear-resisting element 10 are 10d common 0.148"×3" nails spaced 12" apart.

As shown in FIGS. 4 and 5, in the preferred embodiment the first and second chords 19 and 20 of the shear-resisting assembly 9 are formed from two elongated wood members 48, laminated together. Preferably, these elongated wood members 48 are dried 1.5"×3.5" MSR Southern Yellow Pine. The wood members 48 are glued together and then trimmed to a dimension of 2.875"×3". Preferably, the top strut 17 is formed from this same material and in the same manner from two elongated wood members 53 laminated together. The bottom strut 18 is preferably 2.5"×3" pressure-treated Southern Yellow Pine. At these dimensions, the shear-resisting element 10 can be ¹⁵⁄₃₂" wide and still fit within the profile of a wall 1 formed from 2×4 members. The shear-resisting assembly 9 is designed to fit within a wall 1 without interfering with the construction of the wall 1. Electrical and plumbing conduits can easily be run through the wooden first and second chords 19 and 20, and paneling and sheet-rocking can be carried out without interference from the shear-resisting assembly 9.

The shear-resisting assembly 9 can be formed in a variety of dimensions to fit various spaces. In some instances, the shear-resisting element 10 will comprises a single structural panel 49. See FIG. 1. In other instances, the shear-resisting element 10 will be so large that the shear-resisting element 10 will need to be formed from a plurality of adjoining structural panels disposed in a single plane, forming joints between the structural panels. Structural panels 49 are preferably Oriented Strand Board (OSB) ¹⁵⁄₃₂" APA Rated Structural 1 Sheathing, ³²⁄₁₆, Exposure 1. The structural panels 49 can also be formed from plywood, wood and synthetic laminates, wood and steel laminates, gypsum and steel laminates, synthetic materials and steel.

When the shear-resisting element 10 is constructed from a plurality of structural panels 49, intermediate studs 45 and means 46 for connecting the intermediate studs 45 to the shear resisting element 10 can be used to join the structural panels 49 together at their joints. Preferably, the means 46 for connecting the intermediate studs 45 to the shear-resisting element 10 are 10d common 0.148"×3" nails.

Preferably, the bottom strut 18 is made from pressure-treated Southern Yellow Pine, having a cross-sectional dimensions of 2.5"×3". The bottom strut 18 can also be constructed in the same manner and from the same materials as the first and second chords 19 and 20 with the added step of pressure-treating the materials to protect against moisture intrusion.

As shown in FIG. 10, the top plate 7 is preferably made from a plurality of individual elongated wood members 54 joined together by nails or screws to form a double layer.

As described below, in the preferred method of building the wall 1 of the present invention, the shear-resisting assembly 9 is installed first and the remaining components of the wall 1 are built around it. However, sometimes the shear-resisting assembly 9 will need to be added after the remaining components of the wall 1 have been constructed and installed on the underlying structural component 2. In these instances, the shear resisting assembly 9 can be slid into place if the bottom strut 18 is formed with notches 26 for the foundation anchors, notches 37 for the anchor bolts and the first and second holdowns 32 are formed with portals 39. See FIG. 11. The shear-resisting assembly 9 could also be tilted into place as is shown in FIGS. 12 and 13. When the shear-resisting assembly 9 is titled into place, it is best to provide a shim 55 between the top plate 7 of the wall 1 and the top strut 17 of the shear-resisting assembly 9 to eliminate any space between the two.

As shown in FIG. 1, additional nails 56 can be used to connect the top strut 17 of the shear-resisting assembly 9 to the first and second chords 19 and 20.

The following is a description of how to make the preferred form of the present invention, where the underlying structural component 2 is a concrete foundation, as best shown in FIG. 10.

First the shear-resisting assembly 9 is constructed. Preferably, this is done at a factory by assemblers who specialize in their construction. Slotted openings 25 and slotted anchor bolt openings 36 are formed in the bottom strut. The top and bottom struts 17 and 18, the first and second chords 19 and 20 and the intermediate studs 45 are cut to the desired size. The first and second holdowns 32 are attached to the first and second chords 19 and 20. The top strut 17, bottom strut 18, the first chord 19, the second chord 20 and the intermediate studs 45 are placed on a jig. The intermediate studs 45 are connected to the top and bottom struts 17 and 18 with nails driven through the top and bottom struts 17 and 18. Then the first and second chords 19 and 20 are attached to the top strut 17 with nails also driven though the top strut 17, forming a frame for the shear-resisting element. Then a shear-resisting element 10, fitted with boundary edging members 42, is placed on top of the frame. The edge fasteners are then driven through the boundary edging members 42 and shear-resisting element 10 and into the frame. The intermediate studs 45 are also attached to the frame by nails, completing the construction of the shear-resisting assembly 9 at the factory.

At the construction site, the foundation anchors for anchoring the bottom plate 3 of the wall 1, the foundation anchors for anchoring the bottom strut 18 of the shear-resisting assembly 9, and the anchor bolts 31 for anchoring the first and second chords 19 and 20 of the shear-resisting assembly 9 are set into the form for the concrete foundation at the predetermined locations. The concrete form is then poured and allowed to cure.

Next, the shear-resisting assembly 9 is installed on the foundation anchors and the anchor bolts. The foundation anchors are inserted into the slotted openings 25, and the anchor bolts 31 are inserted into the slotted anchor bolt openings 36 in the bottom strut 18 and the slotted openings 38 in the holdowns 32. The toothed plates 28, washers 50 and nuts 30 are then fitted on the foundation anchors. When the shear-resisting assembly 9 is properly aligned with the foundation, the nuts 30 are tightened down on the foundation anchors and the shear-resisting assembly 9 is locked in place. The nuts 33 for the anchor bolts 31 are then tightened down so that they bear upon the first and second holdowns 32.

Next, the remaining wall 1 is constructed. First, the bottom plate 3 is prepared for fitting over the foundation anchors that will attach it to the foundation. This is done by drilling holes in the bottom plate 3 at selected points. Next, the studs 5 are attached to the top and bottom plates 7 and 3. Generally, this will be accomplished with the wall 1 lying flat on the ground. When this stage is completed, the wall 1 is tilted up and fitted over the foundation anchors. Finally, the shear-resisting assembly 9 is attached to the wall 1 by top plate fasteners. The number of top plate fasteners used is dependent on the strength of the top plate fasteners and the loads they will be designed to carry.

Testing

In order to characterize and to determine the preferred form of the present invention, individual shear-resisting assemblies were constructed and tested.

The shear-resisting assemblies were tested in Brea, Calif. at the Simpson Strong-Tie Co. Laboratory on a machine designed to simulate their behavior when inserted in a wall during the cyclic (reversing) lateral forces that would occur during an earthquake.

The tests determine the strength and stiffness of the shear-resisting assemblies. Stiffness is measured in terms of the force that is required to displace the top strut a given lateral distance. Strength is described in these terms as well. Strength is also described by what level of displacement force was being exerted on shear-resisting assembly when there was complete failure—the point at which the shear-resisting assembly no longer provided any meaningful resistance to lateral forces.

Test results are reported in Tables 1, 2 and 3 for a number of different shear-resisting assemblies. Results are reported in terms of the force required to displace the top of the shear-resisting assembly 0.5" (Load at 0.5") under cyclic loading conditions and 1.0" (Load at 1.0") under cyclic loading conditions. Also reported is the load at which complete failure occurred (Maximum Load).

The tests were conducted according to a protocol developed by the Joint Technical Coordinating Committee on Masonry Research (TCCMAR) in 1987. See Porter, M. L., *Sequential Phased Displacement (SPD) procedure for TCC-MAR Testing*, Proceedings of the Third Meeting of the Joint Technical Coordinating Committee on Masonry Research, US-Japan Coordinated Earthquake Research Program, Tomamu, Japan.

The TCCMAR procedure hinges on the concept of the First Major Event (FME), which is defined as the first significant limit state which occurs during the test. The FME occurs when the load capacity of the wall, upon recycling of load to the same wall displacement increment, first drops noticeably from the original load and displacement. FME for all tests was assumed to occur when an 8 foot high shearwall can be displaced 0.8 inches at its top.

The TCCMAR procedure consists of applying cycles of fully-reversing displacement to the shearwall at various increments of the wall's assumed FME. See FIG. 15.

In the first phase, three cycles of fully-reversing displacement are applied to the top of the shearwall at 25% of FME. The first phase continues by then applying three cycles of fully-reversing displacement at 50% of FME. Then, three cycles of fully-reversing displacement are applied at 75% of FME. Then, the fully-reversing displacement is increased for one cycle to 100% of FME. This is the maximum displacement for this first phase. Next, "decay" cycles of displacement for one cycle each at 75%, 50%, and 25% of the phase-maximum are applied in that order respectively. Then, three stabilizing cycles of displacement at the phase-maximum (100% of FME) are applied to the top of the shearwall. These phase-ending cycles stabilize the load-displacement response of the shearwall, prior to the next phase of testing.

In the second phase, which follows immediately according to the test frequency, one phase-maximum cycle of fully-reversing displacement is applied at 125% of FME. Next, "decay" cycles of displacement for one cycle each at 75%, 50%, and 25% of the maximum for that phase are applied in that order respectively. Then, three stabilizing cycles of displacement equal to the phase-maximum for the phase (125% of FME for the second phase) are applied to the shearwall.

In the third phase, one phase-maximum cycle of fully-reversing displacement at 150% of FME is applied to the shearwall. Next, "decay" cycles of displacement for one cycle each at 75%, 50% and 25% of the phase-maximum for the phase are applied. Then, three stabilizing cycles of displacement equal to the phase-maximum (150% of FME for the third phase) are applied to the top of the shearwall.

Successive phases are continued in a like manner as the second and third phases at increased increments, as shown in FIG. 15. The incremental cyclic load-displacement phases are continued at phase-maximums of 175%, 200%, 250%, 300%, 350% and 400% of FME, or until the wall exhibits excessive displacement, or until the wall displacement exceeds the capacity of the test equipment, which in this case was ±3.0 inches. In all trials, the lateral load capacity of the shearwall had greatly diminished by the time the shearwall was displaced 3.0 inches.

Racking shear loads were applied to the test specimens through an actuator located at the top of the wall. The actuator was placed so that the actuator did not interfere with any movement of the structural panel. The actuator that caused deflection at the top of the shearwall was computer controlled. Actuator loads were applied to the wall at a frequency of one cycle per second.

The shear-resisting assemblies were attached to the base of the test frame with ⅝" diameter foundation bolts, passing through the bottom strut, spaced approximately 12 inches on center, and approximately 12 inches from the ends of the shearwall.

The vertically-disposed first and second chords, of the shear-resisting assembly test specimens were attached to the test frame with holdowns and ⅞" inch anchor bolts that passed through the bottom strut. All tests were conducted with Simpson Strong-Tie PHD 8 holdowns, except test F945 which used an experimental holdown formed in accordance with the present invention. The holdowns used for Test F945 are formed with slotted openings for receiving the first and second anchor bolts and attach to the first and second chords by means of ¼"×3" Simpson Strong Drive Screws. The PHD8 holdowns also attach to the first and second chords by means of ¼"×3" Simpson Strong Drive Screws, except they are not formed with slotted openings for receiving the first and second anchor bolts.

Lumber used for the tests varied according to the goals of the test. Generally, lumber moisture content at the time of the tests was approximately 20 to 25%.

The top struts were generally doubled 2×4s connected with nails. The top struts for each shear wall were 48" long. The bottom struts were also typically 2×4s. In addition to the top and bottom struts and the first and second chords, two intermediate 2×4 studs, spaced 16" on center from each other and the first and second chords, were added and end-nailed to the top and bottom struts with nails according to currently accepted building practices, for most tests.

A variety of chords were used for the vertically-disposed first and second chords. In all tests, except test F498, which reflects current building practices, the first and second chords were approximately 93" tall. This means the chords sat directly on the test frame. Setting the chords on the test frame eliminates failure of the shear-resisting assembly due to crushing of the bottom strut by the chords, and greatly improves the performance of the shear-resisting assembly. This particular design of using long chords that bypass the bottom strut is especially effective where the shear-resisting assembly sits on the relatively non-compressible building foundation.

Plywood and Oriented Strand Board structural panels were used for the structural panel or shear-resisting element in the tests. All tests were conducted with one 4'×8' structural panel applied to the framing members with the face grain or strength axis disposed vertically.

Generally, the structural panels were fastened to the top and bottom struts and the first and second chords by steel 10d common nails that were either 2.125" long or 3" long. All nails were driven into the framing members to a depth of at least 11 times their shank diameter to comply with the Uniform Building Code. All nails were driven so that the head of the nail sat flush against either the shear-resisting assembly or the boundary edging members. All nails were spaced 2" on center around the periphery of the structural panel, except where noted otherwise in the tables. Generally, the structural panel was attached to the intermediate studs with 10d×3" long common nails spaced 12" on center.

Table 1 represents a progression from a basic shear-resisting assembly built according to the present invention (Test 495) to a shear-resisting assembly that incorporates most of the preferred elements of the present invention (Test 945). Test F945 used the nailing patterns described in the description of the preferred embodiment to connect the shear-resisting element to the first and second chords and to the bottom and top struts. Test F945 also used the preferred material of Oriented Strand Board for the structural panel. As in the preferred embodiment, the chords of Test F945 were long chords. In Test F945, the first and second chords bypassed the bottom strut and rested directly on the test frame. Test F945 also used first and second chords made from individual wood members glued together to form a laminate. Test F945 used "u" shaped boundary edging members. Finally, Test F945 used holdowns having a slotted openings that connected to the first and second chords by means of holdown fasteners having threaded shanks.

Tables 2 and 3 provide as direct a comparison as is possible between shear-resisting assemblies using different materials for the first and second chords. Again, Test F945 is the preferred unit among the compared assemblies.

TABLE 1

| Test: | F498 | F495 | F494 | F945 |
|---|---|---|---|---|
| Date: | 2/7/97 | 2/5/97 | 2/3/97 | 10/6/97 |
| Wallsize: | 4' × 8' | 4' × 8' | 4' × 8' | 4' × 8' |
| Nailing schedule: | 2" o.c. | 2" o.c. | 2" o.c. | 2" o.c. along top and sides; 3 rows staggered at 4" o.c. along bottom |

TABLE 1-continued

| Test: | F498 | F495 | F494 | F945 |
|---|---|---|---|---|
| Nails: | 10d nails | 10d nails | 10d nails | 10d common × 3" nails |
| Structural panel: | 1/2" S-1 plywood | 1/2" S-1 plywood | 1/2" S-1 plywood | 15/32" S-1 Potlatch OSB |
| Chord design: | short | long | long | long |
| Chords: | 4' × 4' post | 4' × 4' post | 4' × 4' post | Wilamette 84 Glu-Lam SYP |
| Bottom strut: | 1-Wolmerized 2 × 4 | 1-Wolmerized 2 × 4 | 1-Wolmerized 2 × 4 | 1-Douglas Fir 3 × 4 |
| Boundary edging present: | no | no | "u" shaped 20 gauge edging | "u" shaped 20 gauge edging |
| Holdown: | PHD8 | PHD8 | PHD8 | New holdown |
| Foundation Bolts: | 3-5/8" bolts | 3-5/8" bolts | 3-5/8" bolts | 3-5/8" bolts |
| Load at 0.5" | 4,200 | 4,400 | 5,250 | 4,900 |
| Load at 1.0" | 6,350 | 6,450 | 8,650 | 9,000 |
| Maximum Load | 8,400 | 8,250 | 11,850 | 13,150 |

TABLE 2

| Test: | F537 | F900 | F530 | F945 |
|---|---|---|---|---|
| Date: | 3/7/97 | 6/16/97 | 3/3/97 | 10/6/97 |
| Wall size: | 4' × 8' | 4' × 8' | 4' × 8' | 4' × 8' |
| Nailing schedule: | 2" o.c. | 2" o.c. | 2" o.c. | 2" o.c. along top and sides; 3 rows staggered at 4" o.c. along bottom |
| Nails: | 10d common × 3" nails | 10d × 3" nails | 10d × 3" nails | 10d common × 3" nails |
| Structural panel: | 1/2" S-1 plywood | 15/32" S-1 OSB | 1/2" S-1 plywood | 15/32" S-1 Potlatch OSB |
| Chord design: | long | long | long | long |
| Chords: | 4 × 4 Douglas Fir post | 4 × 4 Southern Yellow Pine post | 4 × 4 square Paralam post | Wilamette B4 Glu-Lam SYP |
| Bottom strut: | 1-Wolmerized 2' × 4' | 1-Wolmerized 2' × 4' | 1-Wolmerized 2 × 4 | 1-Douglas Fir 3 × 4 |
| Boundary edging present: | two 20 gauge straps | "u" shaped 20 gauge edging | "u" shaped 20 gauge edging | "u" shaped 20 gauge edging |
| Holdown: | PHD8 | PHD8 | PHD8 | New holdown |
| Foundation Bolts: | 3-5/8" bolts | 3-5/8" bolts | 3-5/8" bolts | 3-5/8" bolts |
| Load at 0.5" | 4,850 | 5,100 | 5,100 | 4,900 |
| Load at 1.0" | 7,500 | 8,150 | 8,000 | 9,000 |
| Maximum Load | 10,550 | 11,300 | 11,000 | 13,150 |

TABLE 3

| Test: | F496 | F536 | F910 | F945 |
|---|---|---|---|---|
| Date: | 2/5/97 | 3/6/97 | 7/8/97 | 10/6/97 |
| Wallsize: | 4' × 8' | 4' × 8' | 4' × 8' | 4' × 8' |
| Nailing schedule: | 2" o.c. | 2" o.c. | 2" o.c. | 2" o.c. along top and sides; 3 rows staggered at 4" o.c. along bottom |
| Nails: | 10d | 10d × 3" nails | 10d × 3" nails | 10d common × 3" nails |
| Structural panel: | 1/2" S-1 plywood | 1/2" S-1 plywood | 15/32" S-1 Potlatch OSB | 15/32" S-1 Potlatch OSB |
| Chord design: | long | long | long | long |
| Chords: | 3' × 3.5' Timberstrand post | 2-1.75" Microlam Studs glued together | Wilamette B4 Glu-Lam SYP | Wilamette 84 Glu-Lam SYP |
| Bottom strut: | 1-Wolmerized 2' × 4' | 1-Wolmerized 2' × 4' | 1-Wolmerized 2' × 4' | 1-Douglas Fir 3 × 4 |
| Boundary edging present: | "u" shaped 20 gauge edging | "u" shaped 20 gauge edging | "u" shaped 20 gauge edging | "u" shaped 20 gauge edging |
| Holdown: | PHD8 | PHD8 | PHD8 | New holdown |

TABLE 3-continued

| Test: | F496 | F536 | F910 | F945 |
|---|---|---|---|---|
| Foundation Bolts: | 3-5/8" bolts | 3-5/8" bolts | 3-5/8" bolts | 3-5/8" bolts |
| Load at 0.5" | 4,750 | 4,200 | 5,500 | 4,900 |
| Load at 1.0" | 7,050 | 7,150 | 8,650 | 9,000 |
| Maximum Load | 9,000 | 10,450 | 11,500 | 13,150 |

We claim:

1. A wall designed to resist lateral forces imposed on a building incorporating said wall, said wall comprising:
   a. an underlying structural component that is part of said building, and a bottom plate resting on and connected to said underlying structural component of said building;
   b. a plurality of vertically-disposed studs resting on and connected said bottom plate;
   c. a wooden top plate resting on and connected to said vertically-disposed studs;
   d. a shear-resisting assembly connected to said top plate and also connected to said underlying structural component and disposed between said top plate and said underlying structural component, said shear-resisting assembly including,
      1. a planar shear-resisting element, said planar shear-resisting element having a proximal face and a distal face, a top edge, a bottom edge and first and second side edges, said shear-resisting assembly also including,
      2. a wooden top strut connected to said top edge of said shear-resisting element, and disposed substantially parallel to said top plate of said wall,
      3. a bottom strut connected to said bottom edge of said shear-resisting element,
      4. a first chord connected to said first side edge of shear-resisting element, and
      5. a second chord connected to said second side edge of said shear-resisting element; and wherein
   fasteners having a threaded shank portion are inserted through said top strut of said shear-resisting assembly and into said top plate to connect said shear resisting assembly to said top plate, said shear-resisting assembly being connected only to said wall at said top plate and said underlying structural component.

2. The wall of claim 1, further comprising:
   a. first and second anchor bolts being anchored to said underlying structural component;
   b. first and second holdowns receiving and being connected to said first and second anchor bolts, respectively, and are also connected to said first and second chords, respectively.

3. A wall designed to resist lateral forces imposed on a building incorporating said wall, said wall comprising:
   a. an underlying structural component that is part of said building, and a bottom plate resting on and connected to said underlying structural component of said building;
   b. a plurality of vertically-disposed studs resting on and connected to said bottom plate;
   c. a top plate resting on and connected to said vertically-disposed studs;
   d. a shear-resisting assembly connected to said top plate and also connected to said underlying structural component and disposed between said top plate and said underlying structural component, said shear-resisting assembly including,
      1. a planar shear-resisting element, said planar shear-resisting element having a proximal face and a distal face, a top edge, a bottom edge and first and second side edges, said shear-resisting assembly also including,
      2. a top strut connected to said top edge of said shear-resisting element, and disposed substantially parallel to said top plate of said wall,
      3. a bottom strut connected to said bottom edge of said shear-resisting element,
      4. a first chord connected to said first side edge of said shear-resisting element, and
      5. a second chord connected to said second side edge of said shear-resisting element, and wherein
   said shear-resisting assembly rests directly on said underlying structural component and said first and second chords of said shear-resisting assembly rest directly on said underlying structural component, and said first and second chords are formed from wood.

4. The wall of claim 3, further comprising:
   a. first and second anchor bolts being anchored to said underlying structural component;
   b. first and second holdowns receiving and being connected to said first and second anchor bolts, respectively, and are also connected to said first and second chords, respectively.

5. A wall designed to resist lateral forces imposed on building incorporating said wall, said wall comprising:
   a. an underlying structural component that is part of said building, and a bottom plate resting on and connected to said underlying structural component of said building;
   b. a plurality of vertically-disposed studs resting on and connected to said bottom plate;
   c. a top plate resting on and connected to said vertically-disposed studs;
   d. a shear-resisting assembly connected to said to plate and also connected to said underlying structural component and disposed between said top plate and said underlying structural component, said shear-resisting assembly including,
      1. a planar shear-resisting element, said planar shear-resisting element having a proximal face and a distal face, a top edge, a bottom edge and first and second side edges, said shear-resisting assembly also including,
      2. a top strut connected to said top edge of said shear-resisting element, and disposed substantially parallel to said top plate of said wall,
      3. a bottom strut connected to said bottom edge of said shear-resisting element,
      4. a first chord connected to said first side edge of said shear-resisting element, and
      5. a second chord connected to said second side edge of said shear-resisting element; and wherein
   said shear-resisting assembly rests directly on said underlying structural component and said first and second chords of said shear-resisting assembly rest on standoff plates resting directly on said underlying structural component, and said first and second chords are formed from wood.

6. The wall of claim 5, further comprising:
   a. first and second anchor bolts being anchored to said underlying structural component;
   b. first and second holdowns receiving and being connected to said first and second anchor bolts, respectively, and are also connected to said first and second chords, respectively.

7. A wall designed to resist lateral forces imposed on a building incorporating said wall, said wall comprising:
   a. an underlying structural component that is part of said building, and a bottom plate resting on and connected to said underlying structural component of said building;
   b. a plurality of vertically-disposed studs resting on and connected to said bottom plate;
   c. a top plate resting on and connected to said vertically-disposed studs;
   d. a shear-resisting assembly connected to said top plate and also connected to said underlying structural component and disposed between said top plate and said underlying structural component, said shear resisting assembly including,
      1. a planar shear-resisting element, said planar shear-resisting element having a proximal face and a distal face, a top edge, a bottom edge and first and second side edges, said shear-resisting assembly also including,
      2. a top strut connected to said top edge of said shear-resisting element, and disposed substantially parallel to said top plate of said wall,
      3. a bottom strut connected to said bottom edge of said shear-resisting element,
      4. a first chord connected to said first side edge of said shear-resisting element, and
      5. a second chord connected to said second side edge of said shear-resisting element;
   e. first and second anchor bolts being anchored to said underlying structural component;
   f. first and second holdowns receiving and being connected to said first and second anchor bolts, respectively, and are also connected to said first and second chords, respectively, by fasteners having threaded shank portions, wherein said threaded fasteners are inserted only a selected distance into said first and second chords without passing all the way through said first and second chords.

8. A wall designed to resist lateral forces imposed on a building incorporating said wall, said wall comprising:
   a. an underlying structural component that is part of said building, and a bottom plate resting on and connected to said underlying structural component of said building;
   b. a plurality of vertically-disposed studs resting on and connected to said bottom plate;
   c. a top plate resting on and connected to said vertically-disposed studs;
   d. a shear-resisting assembly connected to said to plate and also connected to said underlying structural component and disposed between said top plate and said underlying structural component, said shear-resisting assembly including,
      1. a planar shear-resisting element, said planar shear-resisting element having a proximal face and a distal face, a top edge, a bottom edge and first and second side edges, said shear-resisting assembly also including,
      2. a top strut connected to said top edge of said shear-resisting element, and disposed substantially parallel to said top plate of said wall,
      3. a bottom strut connected to said bottom edge of said shear-resisting element,
      4. a first chord connected to said first side edge of said shear-resisting element, and
      5. a second chord connected to said second side edge of said shear-resisting element; and wherein
said planar shear-resisting element is made from wood and edge fasteners having a shank portion connect said top strut, said bottom strut, said first chords and second chord to said shear-resisting element, and boundary edging members disposed on said shear-resisting element at said first and second side edges are pierced by said shank portions of said edge fasteners and thereby strengthen the connection made by said edge fasteners.

9. The wall of claim 8, wherein:
said boundary edging members are u-shaped channels, having a pair of legs joined by a central member that embrace said shear-resisting element, each of said edge fasteners passing through each of said legs of said u-shaped channels.

10. The wall of claim 8, further comprising:
    a. first and second anchor bolts being anchored to said underlying structural component;
    b. first and second holdowns receiving and being connected to said first and second anchor bolts, respectively, and are also connected to said first and second chords, respectively.

11. The wall of claim 9, further comprising:
    a. first and second anchor bolts being anchored to said underlying structural component;
    b. first and second holdowns receiving and being connected to said first and second anchor bolts, respectively, and are also connected to said first and second chords, respectively.

* * * * *